United States Patent
Liu et al.

(10) Patent No.: US 10,616,026 B2
(45) Date of Patent: Apr. 7, 2020

(54) INTERNET OF THINGS COMMUNICATION METHOD, NETWORK SIDE DEVICE, AND INTERNET OF THINGS TERMINAL

(71) Applicant: Huawei Technologies Co., Ltd., Shenzhen, Guangdong (CN)

(72) Inventors: Sheng Liu, Shenzhen (CN); Yi Luo, Shenzhen (CN)

(73) Assignee: HUAWEI TECHNOLOGIES CO., LTD., Shenzhen, Guangdong (CN)

(*) Notice: Subject to any disclaimer, the term of this patent is extended or adjusted under 35 U.S.C. 154(b) by 0 days.

(21) Appl. No.: 15/909,771

(22) Filed: Mar. 1, 2018

(65) Prior Publication Data

US 2018/0191545 A1 Jul. 5, 2018

Related U.S. Application Data

(63) Continuation of application No. PCT/CN2016/088231, filed on Jul. 1, 2016.

(30) Foreign Application Priority Data

Sep. 2, 2015 (CN) .......................... 2015 1 0559591

(51) Int. Cl.
*H04L 27/26* (2006.01)
*H04L 12/24* (2006.01)
(Continued)

(52) U.S. Cl.
CPC ............ *H04L 27/2657* (2013.01); *H04L 7/06* (2013.01); *H04L 41/00* (2013.01); *H04W 72/042* (2013.01); *H04W 74/04* (2013.01); *H04L 5/0007* (2013.01)

(58) Field of Classification Search
CPC ...... H04L 27/2657; H04L 7/06; H04W 74/04; H04W 72/042; H04W 4/70
See application file for complete search history.

(56) References Cited

U.S. PATENT DOCUMENTS

2008/0240275 A1 10/2008 Cai
2012/0188958 A1* 7/2012 Suzuki ............... H04W 74/006
370/329

(Continued)

FOREIGN PATENT DOCUMENTS

CN 102291845 A 12/2011
CN 102355741 A 2/2012
(Continued)

OTHER PUBLICATIONS

Nokia Networks, Nokia Corporation, "On the re-tuning time and DC subcarrier and other issues for MTC," 3GPP TSG-RAN WG4 Meeting #74, R4-150895, Feb. 9-13, 2015, 3 pages.

(Continued)

*Primary Examiner* — Jamal Javaid
(74) *Attorney, Agent, or Firm* — Womble Bond Dickinson (US) LLP

(57) ABSTRACT

The present disclosure discloses an Internet of Things communication method. In the present disclosure, a downlink data frame sent by the network side device includes a legacy preamble, a HEW preamble, and a data field; a subcarrier resource that is corresponding to the data field in a frequency domain includes at least one resource unit RU; and the RU is used to send a downlink IoT frame to the IoT terminal, where the downlink IoT frame includes an IoT preamble and an IoT data field, the IoT preamble is used to transmit physical layer control information of the downlink IoT frame, and the IoT data field is used to transmit downlink data between the network side device and the IoT terminal. According to the present disclosure, a network side device in a WLAN can schedule an IoT terminal, thereby reducing a conflict risk in an IoT communication process.

20 Claims, 17 Drawing Sheets

(51) Int. Cl.
  *H04L 7/06* (2006.01)
  *H04W 72/04* (2009.01)
  *H04W 74/04* (2009.01)
  *H04L 5/00* (2006.01)

(56) References Cited

U.S. PATENT DOCUMENTS

| | | |
|---|---|---|
| 2013/0003668 A1 | 1/2013 | Xiao et al. |
| 2013/0155879 A1 | 6/2013 | He et al. |
| 2013/0301525 A1 | 11/2013 | Xu et al. |
| 2015/0173109 A1 | 6/2015 | Venkatesan et al. |
| 2015/0304077 A1* | 10/2015 | Cao .................. H04B 7/12 370/295 |
| 2016/0219130 A1* | 7/2016 | Ghosh .................. H04L 69/22 |
| 2016/0249381 A1 | 8/2016 | Choi et al. |

FOREIGN PATENT DOCUMENTS

| | | |
|---|---|---|
| CN | 102547581 A | 7/2012 |
| CN | 102769913 A | 11/2012 |
| CN | 103916178 A | 7/2014 |
| JP | 2001203664 A | 7/2001 |
| JP | 2010522500 A | 7/2010 |
| JP | 2014517576 A | 7/2014 |
| JP | 2015522975 A | 8/2015 |
| JP | 2016535553 A | 11/2016 |
| WO | 2013037299 A1 | 3/2013 |
| WO | 2015064943 A1 | 5/2015 |
| WO | 2015076861 A1 | 5/2015 |

OTHER PUBLICATIONS

I-Kang Fu (MediaTek) et al., "Reply Comment to Multi-Carrier DG Output-Guard Sub-carrier Data Transmission," IEEE C802.16m-09/1481, IEEE 802.16 Broadband Wireless Access Working Group, Jul. 12, 2009, 2 pages.

Jiayin Zhang et al, "Preamble structure for 11ax system", IEEE 802.11-15/101r1, Jan. 2015, total 18 pages.

Robert Stacey, "Specification Framework for TGax", IEEE P802.11 Wireless LANS, IEEE 802.11-15/0132-r7, Jul. 2015, total 13 pages.

Tim Godfrey et al, "Integrated Long Range Low Power Operation for IoT",IEEE 802.11-15/0775r1, Jul. 2015, total 19 pages.

* cited by examiner

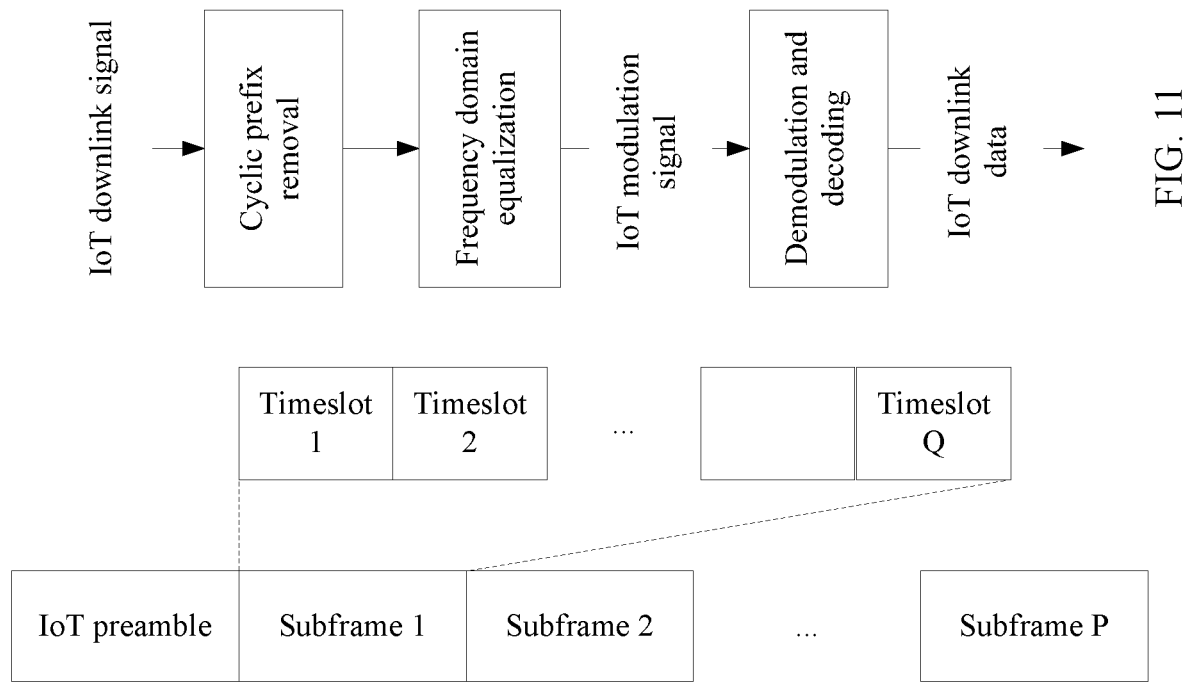
FIG. 11
FIG. 12
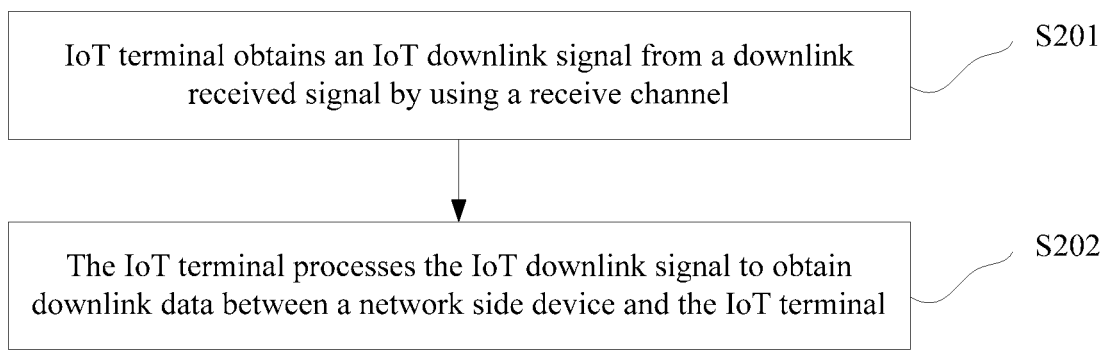
FIG. 13

INTERNET OF THINGS COMMUNICATION METHOD, NETWORK SIDE DEVICE, AND INTERNET OF THINGS TERMINAL

CROSS-REFERENCE TO RELATED APPLICATIONS

This application is a continuation of International Application No. PCT/CN2016/088231, filed on Jul. 1, 2016, which claims priority to Chinese Patent Application No. 201510559591.0, filed on Sep. 2, 2015. The disclosures of the aforementioned applications are hereby incorporated by reference in their entireties.

TECHNICAL FIELD

The present application relates to the field of communications technologies, and in particular, to an Internet of Things communication method, a network side device, and an Internet of Things terminal.

BACKGROUND

As a network of communication between a person and an object and communication between objects, Internet of Things (IoT) is an important part of new-generation information technologies.

In the IoT, to obtain information from the physical world or control an object in the physical world, massive IoT terminals need to be widely deployed. The IoT terminals are various devices that have sensing, computing, execution, and communication capabilities. Further, information transmission, information coordination, and information processing are implemented by using a network.

The extensive and wide deployment of IoT terminals requires relatively low costs, relatively low complexity, and extremely low power consumption of an IoT terminal. To reduce power consumption and costs, an IoT terminal usually uses a channel bandwidth of only 1 to 2 MHz for communication, which is much less than a channel bandwidth used by a wireless local area network (WLAN) device such as a station (STA). WLAN standards include gradually evolved releases such as 802.11a. 802.11n, and 802.11ac. Currently, the IEEE 802.11 standards organization has started standardization work of a new-generation WLAN standard 802.11ax, which is referred to as a high efficiency wireless local area network (HEW). A WLAN device supporting 802.11ax uses a channel bandwidth of at least 20 MHz. Therefore, generally, an IoT terminal cannot directly receive or send a WLAN signal, that is, a WLAN network side device such as an access point (AP) cannot schedule or coordinate IoT communication. Consequently, in a current communications network, a conflict inevitably occurs between IoT terminals and between an IoT terminal and a WLAN device.

SUMMARY

Embodiments of the present disclosure provide an IoT communication method, a network side device, and an IoT terminal, so that the IoT terminal can be scheduled by the network side device in an IoT communication process, to reduce a conflict risk in an IoT communication transmission process.

According to a first aspect, an Internet of Things IoT communication method is provided, including:

determining, by a network side device, a terminal device that performs downlink data transmission, where the terminal device includes an IoT terminal; and sending, by the network side device, a downlink data frame, where the downlink data frame includes a legacy preamble, a high efficiency wireless local area network HEW preamble, and a data field;

a subcarrier resource that is corresponding to the data field in a frequency domain includes at least one resource unit RU; and the RU is used to send a downlink IoT frame to the IoT terminal, where the downlink IoT frame includes an IoT preamble and an IoT data field, the IoT preamble is used to transmit physical layer control information of the downlink IoT frame, and the IoT data field is used to transmit downlink data between the network side device and the IoT terminal.

With reference to the first aspect, in a first implementation, the terminal device further includes a station STA;

the subcarrier resource that is corresponding to the data field in the frequency domain further includes at least one other RU different from the RU; and the at least one other RU is used to transmit downlink data between the network side device and the STA.

With reference to the first aspect or the first implementation of the first aspect, in a second implementation, the network side device specifically sends the downlink IoT frame to the IoT terminal by using the RU in the following manner:

using a specified quantity of subcarriers in two edge locations of the RU as guard subcarriers;

using a specified quantity of subcarriers in a middle location of the RU as direct current subcarriers; and sending the downlink IoT frame to the IoT terminal by using a subcarrier, included in the RU, other than the guard subcarrier and the direct current subcarrier.

With reference to the second implementation of the first aspect, in a third implementation, the data field included in the downlink data frame is specifically generated in the following manner:

performing, by the network side device, coding and modulation on the downlink data between the network side device and the IoT terminal to obtain an IoT downlink modulation symbol, and mapping the IoT downlink modulation symbol to a subcarrier included in the at least one RU;

performing, by the network side device, coding and modulation on the downlink data between the network side device and the STA to obtain a wireless local area network WLAN downlink modulation symbol, and mapping the WLAN downlink modulation symbol to a subcarrier included in the at least one other RU; and performing, by the network side device, inverse fast Fourier transformation IFFT on a frequency domain signal that includes a subcarrier corresponding to the at least one RU and a subcarrier corresponding to the at least one other RU, and adding a cyclic prefix to generate a downlink baseband signal for IoT and WLAN hybrid transmission.

With reference to the first aspect or the first implementation of the first aspect, in a fourth implementation, the network side device specifically sends the downlink IoT frame to the IoT terminal by using the RU in the following manner:

using a specified quantity of subcarriers in two edge locations of the RU as guard subcarriers; and sending the downlink IoT frame to the IoT terminal in a single carrier manner on a frequency band corresponding to a subcarrier, included in the RU, other than the guard subcarrier.

With reference to the fourth implementation of the first aspect, in a fifth implementation, the data field included in the downlink data frame is specifically generated in the following manner:

performing, by the network side device, coding and modulation on the downlink data between the network side device and the STA to obtain a wireless local area network WLAN downlink modulation symbol, and mapping the WLAN downlink modulation symbol to a subcarrier included in the at least one other RU;

performing, by the network side device, inverse fast Fourier transformation IFFT on a frequency domain signal that includes a subcarrier corresponding to the at least one other RU, and adding a cyclic prefix CP to generate a WLAN downlink baseband signal;

performing, by the network side device, coding and modulation on the downlink data between the network side device and the IoT terminal, and adding a CP to generate an IoT downlink single carrier symbol;

performing, by the network side device, waveform shaping filtering on the IoT downlink single carrier symbol to obtain an IoT downlink baseband signal;

performing, by the network side device, frequency translation on the IoT downlink baseband signal to obtain an IoT downlink band-pass signal, where a center frequency of the IoT downlink band-pass signal is $f_r$, and $f_r$ is a frequency difference between a zero frequency and a center frequency of an RU that is used to send a downlink IoT frame; and adding, by the network side device, the IoT downlink band-pass signal and the WLAN downlink baseband signal to obtain a downlink baseband signal for IoT and WLAN hybrid transmission.

With reference to the fifth implementation of the first aspect, in a sixth implementation, the IoT downlink single carrier symbol and an OFDM symbol of the WLAN downlink baseband signal use CPs of a same length, and a length of the IoT downlink single carrier symbol is the same as a length of the OFDM symbol of the WLAN downlink baseband signal.

With reference to the fifth implementation or the sixth implementation of the first aspect, in a seventh implementation, the IoT downlink single carrier symbol includes K modulation symbols, and a period of each modulation symbol is $T_1=T_0/K$; where K is a positive integer that does not exceed a quantity of subcarriers included in the RU that is used to send a downlink IoT frame, $T_1$ is the period of each modulation symbol, and $T_0$ is the length of the OFDM symbol of the WLAN downlink baseband signal.

With reference to the first aspect or any implementation of the first aspect, in an eighth implementation, the RU that is used to send a downlink IoT frame includes at least one basic RU, and the method further includes:

sending, by the network side device, channel indication information in the basic RU, where the channel indication information is used to indicate that the IoT terminal is handed over from the basic RU to an RU that is used to send a downlink IoT frame other than the basic RU.

With reference to the first aspect or any implementation of the first aspect, in a ninth implementation, the physical layer control information that is of the downlink IoT frame and that is transmitted by the IoT preamble includes one or any combination of the following sequences:

a synchronization sequence used by the IoT terminal to obtain timing synchronization and frequency synchronization of the downlink IoT frame; or a training sequence used by the IoT terminal to obtain channel estimation required for demodulating the downlink IoT frame.

With reference to the first aspect or any implementation of the first aspect, in a tenth implementation, the IoT data field includes at least one subframe; and the IoT data field includes downlink data of at least two IoT terminals; where downlink data of each IoT terminal occupies at least one subframe; or downlink data of each IoT terminal occupies at least one timeslot of at least one subframe; or downlink data of each IoT terminal occupies at least one subframe and at least one timeslot of the at least one subframe.

According to a second aspect, an Internet of Things IoT communication method is provided, including:

obtaining, by an IoT terminal, a downlink IoT frame from a downlink received signal, where the downlink received signal includes a downlink data frame sent by a network side device; and the downlink data frame includes a legacy preamble, a high efficiency wireless local area network HEW preamble, and a data field, a subcarrier resource that is corresponding to the data field in a frequency domain includes at least one resource unit RU, the at least one RU is used to send a downlink IoT frame, the downlink IoT frame includes an IoT preamble and an IoT data field, the IoT preamble is used to transmit physical layer control information of the downlink IoT frame, and the IoT data field is used to transmit downlink data between the network side device and the IoT terminal; and processing, by the IoT terminal, the downlink IoT frame to obtain the downlink data between the network side device and the IoT terminal.

With reference to the second aspect, in a first implementation, a bandwidth of a receive channel of the IoT terminal does not exceed a bandwidth of the RU; and a carrier frequency used by the receive channel of the IoT terminal is $f_0+f_r$, where $f_0$ is a carrier frequency of the downlink IoT frame, and $f_r$ is a frequency difference between a center frequency of the RU and a zero frequency.

With reference to the second aspect or the first implementation of the second aspect, in a second implementation, the processing, by the IoT terminal, the downlink IoT frame to obtain the downlink data between the network side device and the IoT terminal includes:

removing, by the IoT terminal, a cyclic prefix CP from each orthogonal frequency division multiplexing OFDM symbol of the downlink IoT frame, and performing upsampling and fast Fourier transformation FFT to obtain an IoT modulation signal that is mapped to a subcarrier included in the RU; and performing, by the IoT terminal, demodulation and decoding on the IoT modulation signal to obtain the downlink data between the network side device and the IoT terminal.

With reference to the second aspect or the first implementation of the second aspect, in a third implementation, the processing, by the IoT terminal, the downlink IoT frame to obtain the downlink data between the network side device and the IoT terminal includes:

removing, by the IoT terminal, a cyclic prefix CP from each single carrier symbol of the downlink IoT frame, and performing frequency domain equalization to obtain an IoT modulation signal that is mapped to a frequency band corresponding to the RU; and performing, by the IoT terminal, demodulation and decoding on the IoT modulation signal to obtain the downlink data between the network side device and the IoT terminal.

With reference to the second aspect or any implementation of the second aspect, in a fourth implementation, the physical layer control information that is of the downlink IoT frame and that is transmitted by the IoT preamble includes one or any combination of the following sequences:

a synchronization sequence used by the IoT terminal to obtain timing synchronization and frequency synchronization of the downlink IoT frame; or a training sequence used by the IoT terminal to obtain channel estimation required for demodulating the downlink IoT frame.

According to a third aspect, an Internet of Things IoT communication method is provided, including:

receiving, by an IoT terminal, an uplink transmission scheduling request sent by a network side device, where the uplink transmission scheduling request is used to schedule the IoT terminal to send an uplink IoT frame; and the uplink IoT frame is located in a data field of an uplink data frame, a subcarrier resource that is corresponding to the data field of the uplink data frame in a frequency domain includes at least one resource unit RU, and the at least one RU is used to send the uplink IoT frame; and sending, by the IoT terminal, the uplink IoT frame according to the uplink transmission scheduling request, where the uplink IoT frame includes an IoT preamble and an IoT data field, the IoT preamble is used to transmit physical layer control information of the uplink IoT frame, and the IoT data field is used to transmit uplink data between the network side device and the IoT terminal.

With reference to the third aspect, in a first implementation, the IoT terminal specifically sends the uplink IoT frame in the following manner:

using a specified quantity of subcarriers in two edge locations of the RU as guard subcarriers;

using a specified quantity of subcarriers in a middle location of the RU as direct current subcarriers; and sending the uplink IoT frame to the network side device on a subcarrier, included in the RU, other than the guard subcarrier and the direct current subcarrier.

With reference to the first implementation of the third aspect, in a second implementation, the IoT terminal specifically sends the uplink IoT frame by using the RU in the following manner:

performing, by the IoT terminal, coding and modulation on the uplink data between the network side device and the IoT terminal to obtain an IoT uplink modulation symbol, and mapping the IoT uplink modulation symbol to a subcarrier included in the RU;

performing, by the IoT terminal, inverse fast Fourier transformation IFFT and downsampling on a frequency domain signal that includes a subcarrier corresponding to the RU, and adding a cyclic prefix to obtain a first IoT uplink baseband signal; and sending the first IoT uplink baseband signal by using an uplink transmit channel, where a carrier frequency of the uplink transmit channel is $f_0+f_r$, where $f_0$ is a carrier frequency of a channel for transmitting the uplink data frame in which the RU is located, and $f_r$ is a frequency difference between a center frequency of the second RU and a zero frequency.

With reference to the third aspect, in a third implementation, the IoT terminal specifically sends the uplink IoT frame in the following manner:

using a specified quantity of subcarriers in two edge locations of the RU as guard subcarriers; and sending the uplink IoT frame to the network side device in a single carrier manner on a frequency band corresponding to a subcarrier, included in the second RU, other than the guard subcarrier.

With reference to the third implementation of the third aspect, in a fourth implementation, the IoT terminal specifically sends the uplink IoT frame in a single carrier manner in the following manner:

performing, by the IoT terminal, coding and modulation on the uplink data between the network side device and the IoT terminal, and adding a cyclic prefix CP to generate an IoT uplink single carrier symbol;

performing, by the IoT terminal, waveform shaping filtering on the IoT uplink single carrier symbol to obtain a second IoT uplink baseband signal; and sending, by the IoT terminal, the second IoT uplink baseband signal by using an uplink transmit channel, where a carrier frequency of the uplink transmit channel is $f_0+f_r$, where $f_0$ is a carrier frequency of a channel for transmitting the uplink data frame in which the RU is located, and $f_r$ is a frequency difference between a center frequency of the RU and a zero frequency.

With reference to the fourth implementation of the third aspect, in a fifth implementation, the IoT uplink single carrier symbol and an OFDM symbol of a WLAN uplink baseband signal sent by the STA use CPs of a same length, and a length of the IoT uplink single carrier symbol is the same as a length of the OFDM symbol of the WLAN uplink baseband signal sent by the STA.

With reference to the fourth implementation or the fifth implementation of the third aspect, in a sixth implementation, the IoT uplink single carrier symbol includes K modulation symbols, and a period of each modulation symbol is $T_1=T_0/K$; where K is a positive integer that does not exceed a quantity of subcarriers included in the RU, $T_1$ is the period of each modulation symbol, and $T_0$ is the length of the OFDM symbol of the WLAN uplink baseband signal sent by the STA.

With reference to the third aspect or any implementation of the third aspect, in a seventh implementation, the physical layer control information that is of the uplink IoT frame and that is transmitted by the IoT preamble includes one or any combination of the following sequences:

a synchronization sequence used by the network side device to obtain timing synchronization and frequency synchronization of the uplink IoT frame; or a training sequence used by the network side device to obtain channel estimation required for demodulating the uplink IoT frame.

With reference to the third aspect or any implementation of the third aspect, in an eighth implementation, the uplink IoT frame includes uplink IoT subframes sent by at least two IoT terminals; and the uplink IoT subframe sent by each IoT terminal includes an IoT preamble and an IoT data field.

With reference to the third aspect or any implementation of the third aspect, in a ninth implementation, the uplink transmission scheduling request is sent by using a downlink data frame sent by the network side device; and the downlink data frame includes a legacy preamble, a high efficiency wireless local area network HEW preamble, and a data field, and a subcarrier resource that is corresponding to the data field of the downlink data frame in the frequency domain includes at least one RU that is used to send the uplink transmission scheduling request.

According to a fourth aspect, an Internet of Things IoT communication method is provided, including:

sending, by a network side device, an uplink transmission scheduling request to an IoT terminal, where the uplink transmission scheduling request is used to schedule the IoT terminal to send an uplink IoT frame; and obtaining, by the network side device, the uplink IoT frame sent by the IoT terminal according to the uplink transmission scheduling request, where the uplink IoT frame is located in a data field of an uplink data frame, a subcarrier resource that is corresponding to the data field of the uplink data frame in a frequency domain includes at least one resource unit RU, and the at least one RU is used to send the uplink IoT frame; and the uplink IoT frame includes an IoT preamble and an IoT data field, the IoT preamble is used to transmit physical layer control information of the uplink IoT frame, and the IoT data field is used to transmit uplink data between the network side device and the IoT terminal.

With reference to the fourth aspect, in a first implementation, the network side device specifically receives, in the following manner, the uplink IoT frame sent by the IoT terminal according to the uplink transmission scheduling request:

obtaining, by the network side device, an uplink received signal, where the uplink received signal includes the uplink IoT frame sent by the IoT terminal;

removing, by the network side device, a cyclic prefix CP from the uplink received signal, and performing fast Fourier transformation FFT to obtain a frequency domain received signal;

obtaining, by the network side device, a signal on a subcarrier corresponding to the RU from the frequency domain received signal to obtain an IoT frequency domain signal; and performing, by the network side device, frequency domain equalization, inverse fast Fourier transformation IFFT, and demodulation and decoding on the IoT frequency domain signal to obtain the uplink data between the network side device and the IoT terminal.

With reference to the fourth aspect or the first implementation of the fourth aspect, in a second implementation, the sending, by a network side device, an uplink transmission scheduling request to an IoT terminal includes:

sending, by the network side device, the uplink transmission scheduling request by using a downlink data frame, where the downlink data frame includes a legacy preamble, a high efficiency wireless local area network HEW preamble, and a data field, and a subcarrier resource that is corresponding to the data field of the downlink data frame in the frequency domain includes at least one RU that is used to send the uplink transmission scheduling request.

With reference to the fourth aspect or any implementation of the fourth aspect, in a third implementation, the physical layer control information that is of the uplink IoT frame and that is transmitted by the IoT preamble includes one or any combination of the following sequences:

a synchronization sequence used by the network side device to obtain timing synchronization and frequency synchronization of the uplink IoT frame; or a training sequence used by the network side device to obtain channel estimation required for demodulating the uplink IoT frame.

According to a fifth aspect, a network side device is provided, including:

a determining unit, configured to determine a terminal device that performs downlink data transmission, where the terminal device includes an IoT terminal; and a sending unit, configured to send a downlink data frame, where the downlink data frame includes a legacy preamble, a high efficiency wireless local area network HEW preamble, and a data field;

a subcarrier resource that is corresponding to the data field in a frequency domain includes at least one resource unit RU; and the RU is used to send a downlink IoT frame to the IoT terminal, where the downlink IoT frame includes an IoT preamble and an IoT data field, the IoT preamble is used to transmit physical layer control information of the downlink IoT frame, and the IoT data field is used to transmit downlink data between the network side device and the IoT terminal.

With reference to the fifth aspect, in a first implementation, the terminal device further includes a station STA;

the subcarrier resource that is corresponding to the data field in the frequency domain further includes at least one other RU different from the RU; and the at least one other RU is used to transmit downlink data between the network side device and the STA.

With reference to the fifth aspect or the first implementation of the fifth aspect, in a second implementation, the sending unit specifically sends the downlink IoT frame to the IoT terminal by using the RU in the following manner:

using a specified quantity of subcarriers in two edge locations of the RU as guard subcarriers;

using a specified quantity of subcarriers in a middle location of the RU as direct current subcarriers; and sending the downlink IoT frame to the IoT terminal by using a subcarrier, included in the RU, other than the guard subcarrier and the direct current subcarrier.

With reference to the second implementation of the fifth aspect, in a third implementation, the sending unit specifically generates the data field included in the downlink data frame in the following manner:

performing coding and modulation on the downlink data between the network side device and the IoT terminal to obtain an IoT downlink modulation symbol, and mapping the IoT downlink modulation symbol to a subcarrier included in the at least one RU;

performing coding and modulation on the downlink data between the network side device and the STA to obtain a wireless local area network WLAN downlink modulation symbol, and mapping the WLAN downlink modulation symbol to a subcarrier included in the at least one other RU; and performing inverse fast Fourier transformation IFFT on a frequency domain signal that includes a subcarrier corresponding to the at least one RU and a subcarrier corresponding to the at least one other RU, and adding a cyclic prefix to generate a downlink baseband signal for IoT and WLAN hybrid transmission.

With reference to the fifth aspect or the first implementation of the fifth aspect, in a fourth implementation, the sending unit specifically sends the downlink IoT frame to the IoT terminal by using the RU in the following manner:

using a specified quantity of subcarriers in two edge locations of the RU as guard subcarriers; and sending the downlink IoT frame to the IoT terminal in a single carrier manner on a frequency band corresponding to a subcarrier, included in the RU, other than the guard subcarrier.

With reference to the fourth implementation of the fifth aspect, in a fifth implementation, the sending unit specifically generates the data field included in the downlink data frame in the following manner:

performing coding and modulation on the downlink data between the network side device and the STA to obtain a wireless local area network WLAN downlink modulation symbol, and mapping the WLAN downlink modulation symbol to a subcarrier included in the at least one other RU;

performing inverse fast Fourier transformation IFFT on a frequency domain signal that includes a subcarrier corresponding to the at least one other RU, and adding a cyclic prefix CP to generate a WLAN downlink baseband signal;

performing coding and modulation on the downlink data between the network side device and the IoT terminal, and adding a CP to generate an IoT downlink single carrier symbol;

performing waveform shaping filtering on the IoT downlink single carrier symbol to obtain an IoT downlink baseband signal;

performing frequency translation on the IoT downlink baseband signal to obtain an IoT downlink band-pass signal, where a center frequency of the IoT downlink band-pass signal is $f_r$, and $f_r$ is a frequency difference between a zero frequency and a center frequency of an RU that is used to send a downlink IoT frame; and adding the IoT downlink band-pass signal and the WLAN downlink baseband signal to obtain a downlink baseband signal for IoT and WLAN hybrid transmission.

With reference to the fifth implementation of the fifth aspect, in a sixth implementation, the IoT downlink single carrier symbol and an OFDM symbol of the WLAN downlink baseband signal use CPs of a same length, and a length of the IoT downlink single carrier symbol is the same as a length of the OFDM symbol of the WLAN downlink baseband signal.

With reference to the fifth implementation or the sixth implementation of the fifth aspect, in a seventh implementation, the IoT downlink single carrier symbol includes K modulation symbols, and a period of each modulation symbol is $T_1=T_0/K$; where K is a positive integer that does not exceed a quantity of subcarriers included in the RU that is used to send a downlink IoT frame, $T_1$ is the period of each modulation symbol, and $T_0$ is the length of the OFDM symbol of the WLAN downlink baseband signal.

With reference to the fifth aspect or any implementation of the fifth aspect, in an eighth implementation, the RU that is used to send a downlink IoT frame includes at least one basic RU; and the sending unit is further configured to send channel indication information in the basic RU, where the channel indication information is used to indicate that the IoT terminal is handed over from the basic RU to an RU that is used to send a downlink IoT frame other than the basic RU.

With reference to the fifth aspect or any implementation of the fifth aspect, in a ninth implementation, the physical layer control information that is of the downlink IoT frame and that is transmitted by the IoT preamble includes one or any combination of the following sequences:

a synchronization sequence used by the IoT terminal to obtain timing synchronization and frequency synchronization of the downlink IoT frame; or a training sequence used by the IoT terminal to obtain channel estimation required for demodulating the downlink IoT frame.

With reference to the fifth aspect or any implementation of the fifth aspect, in a tenth implementation, the IoT data field includes at least one subframe; and the IoT data field includes downlink data of at least two IoT terminals; where downlink data of each IoT terminal occupies at least one subframe; or downlink data of each IoT terminal occupies at least one timeslot of at least one subframe; or downlink data of each IoT terminal occupies at least one subframe and at least one timeslot of the at least one subframe.

According to a sixth aspect, an IoT terminal is provided, including:

an obtaining unit, configured to obtain a downlink IoT frame from a downlink received signal, where the downlink received signal includes a downlink data frame sent by a network side device; and the downlink data frame includes a legacy preamble, a high efficiency wireless local area network HEW preamble, and a data field, a subcarrier resource that is corresponding to the data field in a frequency domain includes at least one resource unit RU, the at least one RU is used to send a downlink IoT frame, the downlink IoT frame includes an IoT preamble and an IoT data field, the IoT preamble is used to transmit physical layer control information of the downlink IoT frame, and the IoT data field is used to transmit downlink data between the network side device and the IoT terminal; and a processing unit, configured to process the downlink IoT frame obtained by the obtaining unit, to obtain the downlink data between the network side device and the IoT terminal.

With reference to the sixth aspect, in a first implementation, a bandwidth of a receive channel of the IoT terminal does not exceed a bandwidth of the RU; and a carrier frequency used by the receive channel of the IoT terminal is $f_0+f_r$, where $f_0$ is a carrier frequency of the downlink IoT frame, and $f_r$ is a frequency difference between a center frequency of the RU and a zero frequency.

With reference to the sixth aspect or the first implementation of the sixth aspect, in a second implementation, the processing unit is specifically configured to process the downlink IoT frame to obtain the downlink data between the network side device and the IoT terminal in the following manner:

removing a cyclic prefix CP from each orthogonal frequency division multiplexing OFDM symbol of the downlink IoT frame, and performing upsampling and fast Fourier transformation FFT to obtain an IoT modulation signal that is mapped to a subcarrier included in the RU; and performing demodulation and decoding on the IoT modulation signal to obtain the downlink data between the network side device and the IoT terminal.

With reference to the sixth aspect or the first implementation of the sixth aspect, in a third implementation, the processing unit is specifically configured to process the downlink IoT frame to obtain the downlink data between the network side device and the IoT terminal in the following manner:

removing a cyclic prefix CP from each single carrier symbol of the downlink IoT frame, and performing frequency domain equalization to obtain an IoT modulation signal that is mapped to a frequency band corresponding to the RU; and performing demodulation and decoding on the IoT modulation signal to obtain the downlink data between the network side device and the IoT terminal.

With reference to the sixth aspect or any implementation of the sixth aspect, in a fourth implementation, the physical layer control information that is of the downlink IoT frame and that is transmitted by the IoT preamble includes one or any combination of the following sequences:

a synchronization sequence used by the IoT terminal to obtain timing synchronization and frequency synchronization of the downlink IoT frame; or a training sequence used by the IoT terminal to obtain channel estimation required for demodulating the downlink IoT frame.

According to a seventh aspect, an IoT terminal is provided, including:

a receiving unit, configured to receive an uplink transmission scheduling request sent by a network side device, where the uplink transmission scheduling request is used to schedule the IoT terminal to send an uplink IoT frame, the uplink IoT frame is located in a data field of an uplink data frame, a sub carrier resource that is corresponding to the data field of the uplink data frame in a frequency domain includes at least one resource unit RU, and the at least one RU is used to send the uplink IoT frame; and a sending unit, configured to send the uplink IoT frame according to the uplink transmission scheduling request received by the receiving unit, where the uplink IoT frame includes an IoT preamble and an IoT data field, the IoT preamble is used to transmit physical layer control information of the uplink IoT frame, and the IoT data field is used to transmit uplink data between the network side device and the IoT terminal.

With reference to the seventh aspect, in a first implementation, the sending unit specifically sends the uplink IoT frame in the following manner:

using a specified quantity of subcarriers in two edge locations of the RU as guard subcarriers;

using a specified quantity of subcarriers in a middle location of the RU as direct current subcarriers; and sending the uplink IoT frame to the network side device on a subcarrier, included in the RU, other than the guard subcarrier and the direct current subcarrier.

With reference to the first implementation of the seventh aspect, in a second implementation, the sending unit specifically sends the uplink IoT frame by using the RU in the following manner:

performing coding and modulation on the uplink data between the network side device and the IoT terminal to obtain an IoT uplink modulation symbol, and mapping the IoT uplink modulation symbol to a subcarrier included in the RU;

performing inverse fast Fourier transformation IFFT and downsampling on a frequency domain signal that includes a sub carrier corresponding to the RU, and adding a cyclic prefix to obtain a first IoT uplink baseband signal; and sending the first IoT uplink baseband signal by using an uplink transmit channel, where a carrier frequency of the uplink transmit channel is $f_0+f_r$, where $f_0$ is a carrier frequency of a channel for transmitting the uplink data frame in which the RU is located, and $f_r$ is a frequency difference between a center frequency of the second RU and a zero frequency.

With reference to the seventh aspect, in a third implementation, the sending unit specifically sends the uplink IoT frame in the following manner:

using a specified quantity of subcarriers in two edge locations of the RU as guard subcarriers; and sending the uplink IoT frame to the network side device in a single carrier manner on a frequency band corresponding to a subcarrier, included in the second RU, other than the guard subcarrier.

With reference to the third implementation of the seventh aspect, in a fourth implementation, the sending unit specifically sends the uplink IoT frame in a single carrier manner in the following manner:

performing coding and modulation on the uplink data between the network side device and the IoT terminal, and adding a cyclic prefix CP to generate an IoT uplink single carrier symbol;

performing waveform shaping filtering on the IoT uplink single carrier symbol to obtain a second IoT uplink baseband signal; and sending the second IoT uplink baseband signal by using an uplink transmit channel, where a carrier frequency of the uplink transmit channel is $f_0+f_r$, where $f_0$ is a carrier frequency of a channel for transmitting the uplink data frame in which the RU is located, and $f_r$ is a frequency difference between a center frequency of the RU and a zero frequency.

With reference to the fourth implementation of the seventh aspect, in a fifth implementation, the IoT uplink single carrier symbol and an OFDM symbol of a WLAN uplink baseband signal sent by the STA use CPs of a same length, and a length of the IoT uplink single carrier symbol is the same as a length of the OFDM symbol of the WLAN uplink baseband signal sent by the STA.

With reference to the fourth implementation or the fifth implementation of the seventh aspect, in a sixth implementation, the IoT uplink single carrier symbol includes K modulation symbols, and a period of each modulation symbol is $T_1=T_0/K$; where K is a positive integer that does not exceed a quantity of subcarriers included in the RU, $T_1$ is the period of each modulation symbol, and $T_0$ is the length of the OFDM symbol of the WLAN uplink baseband signal sent by the STA.

With reference to the seventh aspect or any implementation of the seventh aspect, in a seventh implementation, the physical layer control information that is of the uplink IoT frame and that is transmitted by the IoT preamble includes one or any combination of the following sequences:

a synchronization sequence used by the network side device to obtain timing synchronization and frequency synchronization of the uplink IoT frame; or a training sequence used by the network side device to obtain channel estimation required for demodulating the uplink IoT frame.

With reference to the seventh aspect or any implementation of the seventh aspect, in an eighth implementation, the uplink IoT frame includes uplink IoT subframes sent by at least two IoT terminals; and the uplink IoT subframe sent by each IoT terminal includes an IoT preamble and an IoT data field.

With reference to the seventh aspect or any implementation of the seventh aspect, in a ninth implementation, the uplink transmission scheduling request is sent by using a downlink data frame sent by the network side device; and the downlink data frame includes a legacy preamble, a high efficiency wireless local area network HEW preamble, and a data field, and a subcarrier resource that is corresponding to the data field of the downlink data frame in the frequency domain includes at least one RU that is used to send the uplink transmission scheduling request.

According to an eighth aspect, a network side device is provided, including:

a sending unit, configured to send an uplink transmission scheduling request to an IoT terminal, where the uplink transmission scheduling request is used to schedule the IoT terminal to send an uplink IoT frame; and an obtaining unit, configured to obtain the uplink IoT frame sent by the IoT terminal according to the uplink transmission scheduling request sent by the sending unit, where the uplink IoT frame is located in a data field of an uplink data frame, a subcarrier resource that is corresponding to the data field of the uplink data frame in a frequency domain includes at least one resource unit RU, and the at least one RU is used to send the uplink IoT frame; and the uplink IoT frame includes an IoT preamble and an IoT data field, the IoT preamble is used to transmit physical layer control information of the uplink IoT frame, and the IoT data field is used to transmit uplink data between the network side device and the IoT terminal.

With reference to the eighth aspect, in a first implementation, the obtaining unit specifically obtains, in the following manner, the uplink IoT frame sent by the IoT terminal according to the uplink transmission scheduling request:

obtaining an uplink received signal, where the uplink received signal includes the uplink IoT frame sent by the IoT terminal;

removing a cyclic prefix CP from the uplink received signal, and performing fast Fourier transformation FFT to obtain a frequency domain received signal;

obtaining a signal on a subcarrier corresponding to the RU from the frequency domain received signal to obtain an IoT frequency domain signal; and performing frequency domain equalization, inverse fast Fourier transformation IFFT, and demodulation and decoding on the IoT frequency domain signal to obtain the uplink data between the network side device and the IoT terminal.

With reference to the eighth aspect or the first implementation of the eighth aspect, in a second implementation, the sending unit specifically sends the uplink transmission scheduling request to the IoT terminal in the following manner:

sending the uplink transmission scheduling request by using a downlink data frame, where the downlink data frame includes a legacy preamble, a high efficiency wireless local area network HEW preamble, and a data field, and a subcarrier resource that is corresponding to the data field of the downlink data frame in the frequency domain includes at least one RU that is used to send the uplink transmission scheduling request.

With reference to the eighth aspect or any implementation of the eighth aspect, in a third implementation, the physical layer control information that is of the uplink IoT frame and that is transmitted by the IoT preamble includes one or any combination of the following sequences:

a synchronization sequence used by the network side device to obtain timing synchronization and frequency synchronization of the uplink IoT frame; or a training sequence used by the network side device to obtain channel estimation required for demodulating the uplink IoT frame.

According to the IoT communication method, the network side device, and the IoT terminal provided in the embodiments of the present disclosure, a subcarrier resource that is corresponding to a data field of a WLAN data frame in a frequency domain includes an RU that is used to transmit downlink data or uplink data between the network side device and the IoT terminal, and an RU that is used to transmit downlink data or uplink data between the network side device and the STA, so that the IoT terminal and the STA can share a data frame in a WLAN network for data sending or receiving, and further, a network side device in the WLAN can schedule the IoT terminal, thereby reducing a conflict risk in an IoT communication process.

BRIEF DESCRIPTION OF DRAWINGS

FIG. 11 is a schematic diagram of a process in which an IoT terminal obtains downlink data in a single carrier manner according to an embodiment of the present disclosure;

FIG. 12 is a schematic structural diagram of time division multiplexing of a downlink IoT frame according to an embodiment of the present disclosure;

FIG. 13 is an implementation flowchart of a second IoT communication method according to an embodiment of the present disclosure;

DESCRIPTION OF EMBODIMENTS

The following clearly describes the technical solutions in the embodiments of the present disclosure with reference to the accompanying drawings in the embodiments of the present disclosure.

Figure 1:
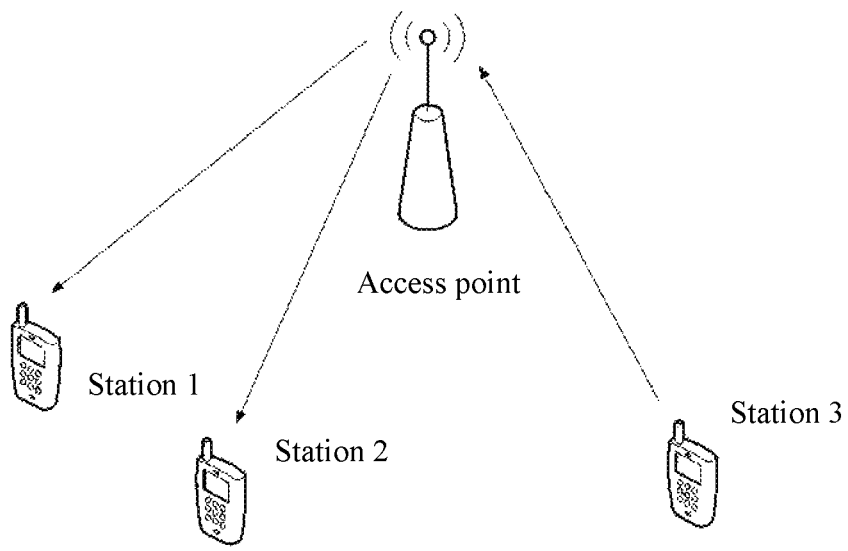
FIG. 1 is a schematic architecture diagram of a WLAN network.

An IoT communication method provided in the embodiments of the present disclosure may be applied to a network architecture of a wireless local access network (WLAN) shown in FIG. 1. A WLAN network device such as an access point (AP) in FIG. 1 is responsible for bidirectional communication with a WLAN device such as multiple stations (STAs). That is, the AP may send downlink data to the STA. As shown in FIG. 1, the AP may send downlink data to a STA1 and a STA2. The AP may also receive uplink data from the STAs. As shown in FIG. 1, the AP may receive uplink data from a STA3.

The WLAN supports the 802.11a, 802.11n, 802.11ac, and 802.11ax standards proposed by the IEEE 802.11 standards organization. For ease of description, the following describes the embodiments of the present disclosure by using the 802.11ax standard supported by the WLAN as an example. It should be noted that, 802.11ax related to the embodiments of the present disclosure is the WLAN. 802.11ax supports an orthogonal frequency division multiplexing (OFDM) technology. In OFDMA, a bandwidth channel is divided into multiple orthogonal subcarriers in a frequency domain, and different subcarriers are allocated to different users, so as to implement multi-user orthogonal multiplex transmission.

In the embodiments of the present disclosure, an IoT terminal and a STA can perform frequency division multiplexing on a subcarrier resource corresponding to an 802.11ax physical layer data frame in the frequency domain, so as to support IoT in 802.11ax.

Figure 2:
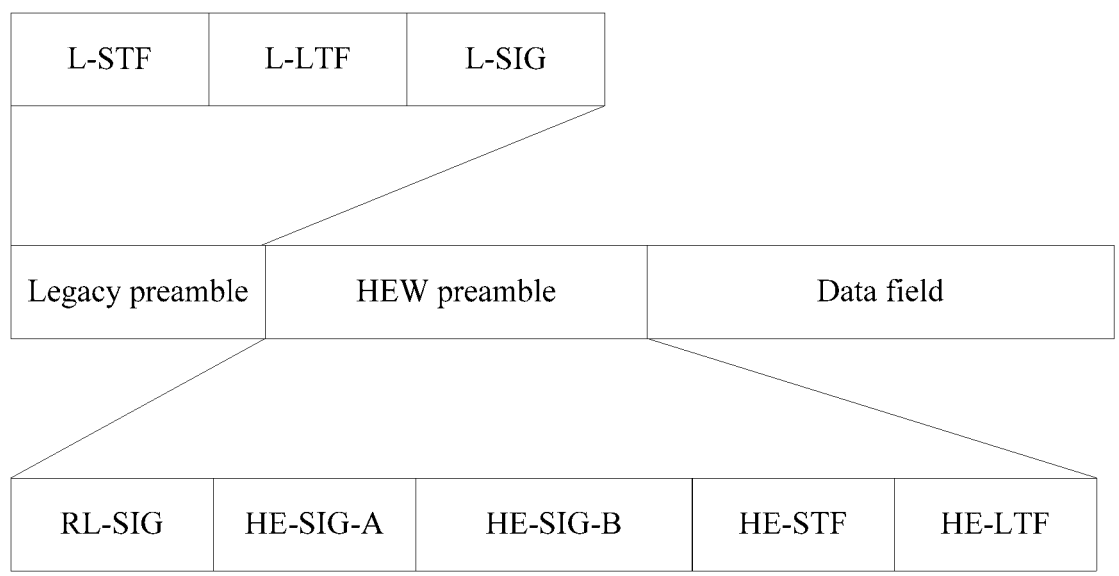
FIG. 2 is a packet structure of an 802.11ax physical layer data frame.

FIG. 2 shows a packet structure of the 802.11ax physical layer data frame. As shown in FIG. 2, the 802.11ax physical layer data frame includes a legacy preamble, a HEW preamble, and a data field. The first part of the 802.11ax physical layer data frame is the legacy preamble, the last part is the data field, and an 802.11ax protocol-specific preamble, that is, the HEW preamble, is located between the legacy preamble and the data field. The legacy preamble includes a legacy short training field (L-STF), a legacy long training field (L-LTF), and a legacy signal field (L-SIG). The HEW field includes a repeated legacy signal field (RL-SIG), a high efficient signal-A field (HE-SIG-A), a high efficient signal-B field (HE-SIG-B), a high efficient short training field (HE-STF), a high efficient long training field (HE-LTF), and the like. The data field is used for data transmission. The L-SIG, the RL-SIG, the HE-SIG-A, the HE-SIG-B, and the like are separately used to transmit different types of physical layer signaling. The L-STF, the L-LTF, the HE-STF, the HE-LTF, and the like are mainly used for timing synchronization, frequency synchronization, automatic gain control, channel estimation, and the like.

Figure 3:
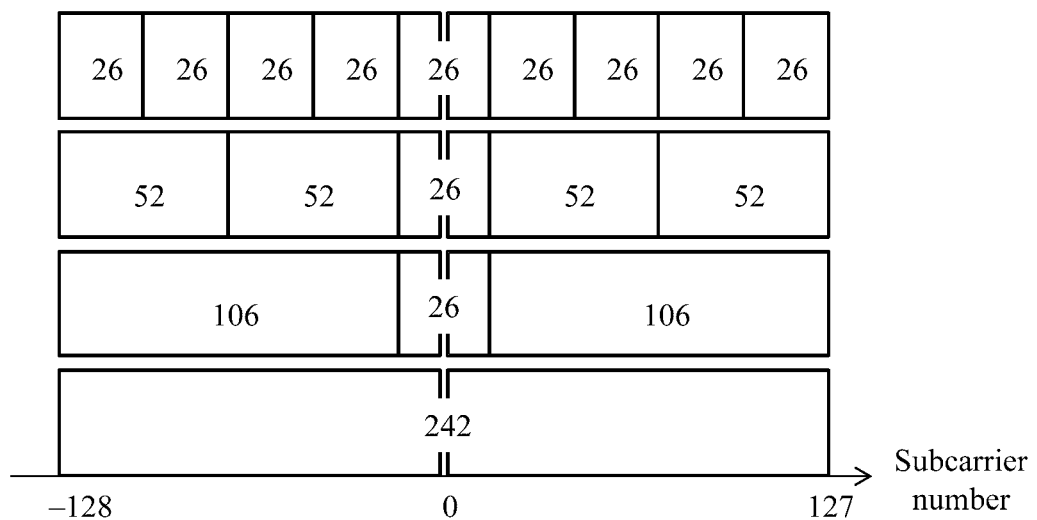
FIG. 3 is a schematic division diagram of a subcarrier resource corresponding to a data field of an 802.11ax data frame in a frequency domain.

A subcarrier resource that is corresponding to the data field of the 802.11ax physical layer data frame in the frequency domain is divided into at least one resource unit (RU). In an example of a 20 MHz channel, the 20 MHz channel is corresponding to 256 subcarrier resources in the frequency domain. As shown in FIG. 3, the 256 subcarrier resources are respectively numbered −128, −127, . . . , 126, and 127. Subcarriers in a middle location, that is, a subcarrier −1, a subcarrier 0, and a subcarrier 1, are referred to as direct current subcarriers. Because the three subcarriers are easily affected by direct current offset in a transceiver system, the three subcarriers are not used for data transmission. Subcarriers in two edge locations, that is, left-side six subcarriers that are numbered from −128 to −123 and right-side five subcarriers that are numbered from 123 to 127, are referred to as guard subcarriers. The guard subcarriers are used to reduce out-of-band leakage of a transmitted signal, so as to avoid interference to an adjacent channel. Therefore, the guard subcarriers are not used for data transmission either. In other words, subcarriers available for data transmission in the 20 MHz channel are 242 subcarriers in total including subcarriers numbered from −122 to −2 and subcarriers numbered from 2 to 122. The 242 subcarriers available for data transmission are further divided into RUs including different quantities of subcarriers, for example, RUs including 26, 52, 106, and 242 subcarriers. Therefore, as shown in FIG. 3, the 20 MHz channel may include a maximum of nine RUs each including 26 subcarriers, four RUs each including 52 subcarriers, two RUs each including 106 subcarriers, or one RU including 242 subcarriers. Similarly, a 40 MHz channel may include a maximum of 18 RUs each including 26 subcarriers, eight RUs each including 52 subcarriers, four RUs each including 106 subcarriers, two RUs each including 242 subcarriers, or one RU including 484 subcarriers. An 80 MHz channel may include a maximum of 37 RUs each including 26 subcarriers, 16 RUs each including 52 subcarriers, eight RUs each including 106 subcarriers, four RUs each including 242 subcarriers, two RUs each including 484 subcarriers, or one RU including 996 subcarriers.

In the embodiments of the present disclosure, the IoT terminal and the STA perform frequency division multiplexing on the subcarrier resource that is corresponding to the data field of the 802.11ax physical layer data frame in the frequency domain. In the embodiments of the present disclosure, the subcarrier resource that is corresponding to the data field of the 802.11ax physical layer data frame in the frequency domain includes an IoT-RU and a non-IoT-RU. The IoT-RU is used to transmit downlink data or uplink data between a network side device and the IoT terminal. The non-IoT-RU is used to transmit downlink data or uplink data between the network side device and the STA.

Further, in the embodiments of the present disclosure, the legacy preamble and the HEW preamble included in the 802.11ax physical layer data frame are not used for frequency division multiplexing in IoT communication, that is, the legacy preamble and the HEW preamble are still used for communication between the network side device and the STA.

Figure 4:
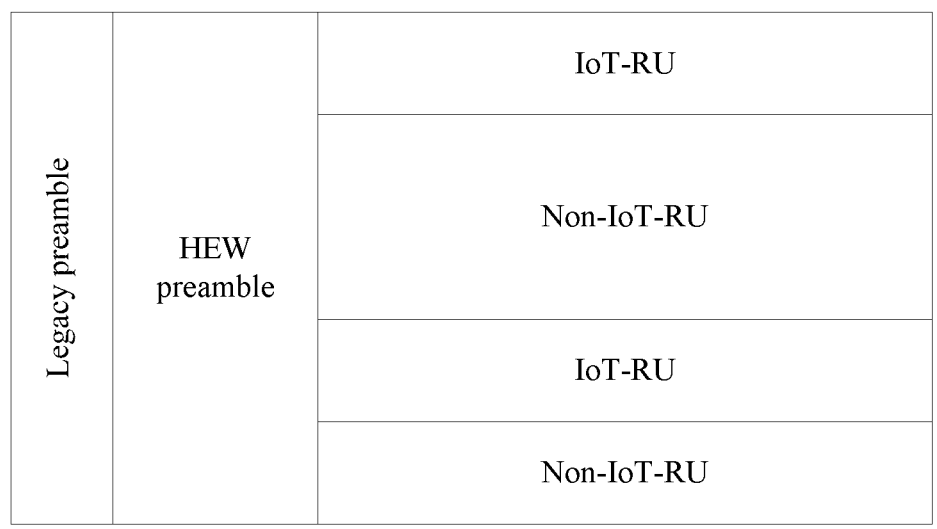
FIG. 4 is a schematic structural diagram of a data frame according to an embodiment of the present disclosure.

FIG. 4 shows a schematic structural diagram of a data frame for data transmission according to an embodiment of the present disclosure, where the IoT terminal and the STA perform multiplexing on the subcarrier resource that is corresponding to the data field of the 802.11ax physical layer data frame in the frequency domain, so as to perform the data transmission. In FIG. 4, the IoT-RU is used to transmit downlink data or uplink data between the AP and the IoT terminal, and the non-IoT-RU is used to transmit downlink data or uplink data between the AP and the STA.

In the embodiments of the present disclosure, a structure of the data frame in FIG. 4 is used for IoT communication, so as to implement communication between the IoT terminal and the network side device in 802.11ax. That is, the network side device can schedule and coordinate IoT communication, thereby avoiding a conflict between IoT terminals and a conflict between an IoT terminal and a WLAN device.

In the embodiments of the present disclosure, the following specifically describes how to implement communication between the IoT terminal and the network side device in 802.11ax.

Figure 5:
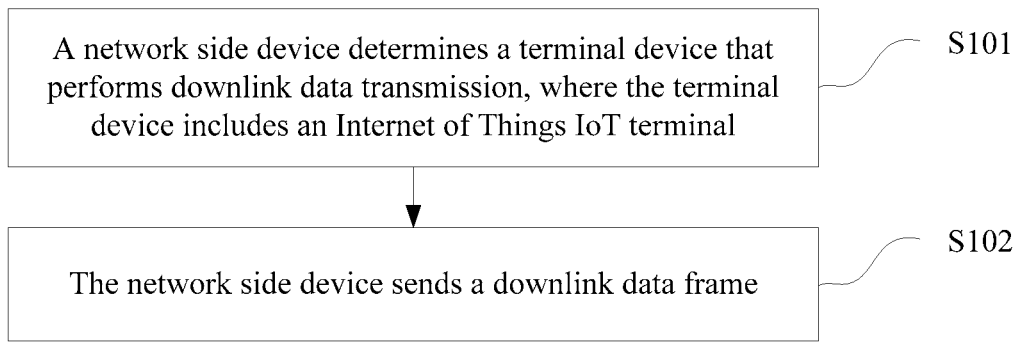
FIG. 5 is an implementation flowchart of a first IoT communication method according to an embodiment of the present disclosure.

FIG. 5 is an implementation flowchart of a first IoT communication method according to an embodiment of the present disclosure. The method in FIG. 5 is executed by a network side device, and the network side device may be, for example, an AP. This is not limited in this embodiment of the present disclosure. As shown in FIG. 5, the implementation flowchart of the first IoT communication method provided in this embodiment of the present disclosure includes the following steps.

S101: The network side device determines a terminal device that performs downlink data transmission.

In this embodiment of the present disclosure, different from the prior art in which the network side device determines a STA supporting 802.11ax as the terminal device that performs downlink data transmission, the network side device in this embodiment of the present disclosure may further determine an IoT terminal as the terminal device that performs downlink data transmission. That is, the terminal device that performs downlink data transmission determined by the network side device may be the STA supporting 802.11ax or the IoT terminal. In other words, in this embodiment of the present disclosure, the determined terminal device that performs downlink data transmission may include the STA supporting 802.11ax and the IoT terminal, or may include only the IoT terminal.

It should be noted that, the downlink data transmission in this embodiment of the present disclosure may be a communication process in which the network side device sends downlink data, and the terminal device receives the downlink data.

S102: The network side device sends a downlink data frame.

In this embodiment of the present disclosure, after determining the terminal device that performs downlink data transmission, the network side device may send the downlink data frame.

Figure 6:
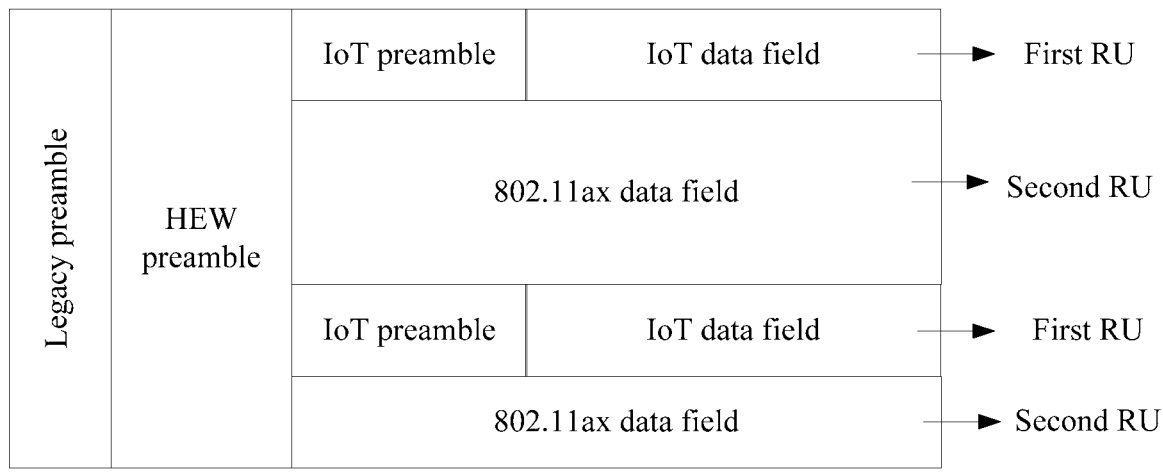
FIG. 6 is a schematic structural diagram of a downlink data frame according to an embodiment of the present disclosure.

FIG. 6 is a schematic structural diagram of the downlink data frame related to this embodiment of the present disclosure. The downlink data frame shown in FIG. 6 includes a legacy preamble, a HEW preamble, and a data field. The legacy preamble shown in FIG. 6 includes fields such as the L-STF, the L-LTF, and the L-SIG shown in FIG. 2, and the HEW preamble shown in FIG. 6 includes fields such as the RL-SIG, the HE-SIG-A, the HE-SIG-B, the HE-STF, and the HE-LTF shown in FIG. 2. That is, the legacy preamble and the HEW preamble included in the downlink data frame related to this embodiment of the present disclosure have same functions and same structures as the legacy preamble and the HEW preamble in 802.11ax, and both are used for communication between the network side device and the STA.

In this embodiment of the present disclosure, the data field included in the downlink data frame shown in FIG. 6 is different from the data field of the 802.11ax data frame structure shown in FIG. 2. In this embodiment of the present disclosure, a subcarrier resource that is corresponding to the data field of the downlink data frame shown in FIG. 6 in a frequency domain includes at least one RU that is used to send a downlink IoT frame to the IoT terminal.

In this embodiment of the present disclosure, the downlink IoT frame includes an IoT preamble and an IoT data field, the IoT preamble is used to transmit physical layer control information of the downlink IoT frame, and the IoT data field is used to transmit downlink data between the network side device and the IoT terminal.

In this embodiment of the present disclosure, if the terminal device determined by the network side device includes the STA, the subcarrier resource that is corresponding to the data field in the frequency domain further includes at least one other RU different from the RU that is used to transmit an IoT downlink data frame, and the at least one other RU is used to transmit downlink data between the network side device and the STA.

In this embodiment of the present disclosure, for ease of description, the RU that is used to transmit the IoT downlink data frame is referred to as a first RU, and the RU that is used to transmit the downlink data between the network side device and the STA is referred to as a second RU. In this embodiment of the present disclosure, the first RU is equivalent to the IoT-RU in FIG. 4 and is used to send the downlink IoT frame to the IoT terminal. The second RU is equivalent to the non-IoT-RU in FIG. 4 and is used to send the downlink data between the network side device and the STA to the STA.

In this embodiment of the present disclosure, the downlink IoT frame sent by using the first RU shown in FIG. 6 includes an IoT preamble and an IoT data field, the IoT preamble is used to transmit the physical layer control information of the downlink IoT frame, and the IoT data field is used to transmit the downlink data between the network side device and the IoT terminal.

In this embodiment of the present disclosure, the physical layer control information that is of the downlink IoT frame and that is transmitted by the IoT preamble includes one or any combination of the following sequences:

a synchronization sequence used by the IoT terminal to obtain timing synchronization and frequency synchronization of the downlink IoT frame; or a training sequence used by the IoT terminal to obtain channel estimation required for demodulating the downlink IoT frame.

In this embodiment of the present disclosure, the downlink IoT frame is sent in the first RU of the data field, so that the IoT terminal can parse a preamble part of the downlink IoT frame to obtain information about timing synchronization, frequency synchronization, and channel estimation performed by the IoT terminal, without a need to parse a preamble part in 802.11ax. That is, the IoT terminal does not need to support a high bandwidth of 20/40/80 MHz, and a narrow-band IoT terminal with a constrained bandwidth is effectively supported, thereby meeting a requirement of low complexity and low power consumption of the IoT device.

According to the IoT downlink communication method provided in this embodiment of the present disclosure, the network side device determines that the terminal device that performs downlink data transmission includes the IoT terminal, that is, the network side device may send the downlink data to the IoT terminal, so that the network side device can schedule and coordinate the IoT terminal. Further, the legacy preamble and the HEW preamble in the downlink data frame sent on a network side in this embodiment of the present disclosure have same structures as preambles in 802.11ax, so that the STA can receive the legacy preamble and the HEW preamble in the downlink data frame sent on the network side in this embodiment of the present disclosure, and can be scheduled and coordinated by the network side device. Therefore, the STA does not contend with the IoT terminal for a channel, thereby avoiding a conflict between the IoT terminal and a WLAN device such as the STA. The IoT terminal and the STA perform frequency division multiplexing on the data field in the downlink data frame sent on the network side in this embodiment of the present disclosure, so that the STA and the IoT terminal can share a WLAN channel resource, and do not interfere with each other in a downlink transmission process.

In this embodiment of the present disclosure, the following specifically describes an implementation process in which the network side device sends the downlink IoT frame to the IoT terminal by using the first RU.

Implementation 1: The network side device sends the downlink IoT frame to the IoT terminal by using the first RU in an OFDM manner.

The IoT device cannot directly receive a downlink received signal of a high bandwidth of 20 MHz in 802.11ax. Instead, the IoT device filters out an out-of-band 802.11ax signal of the first RU in the downlink received signal by using an analog filter of a receive channel, that is, the IoT device receives only an in-band IoT signal of the first RU. Therefore, in this embodiment of the present disclosure, to avoid interference from the out-of-band 802.11ax signal of the first RU to the in-band IoT signal of the first RU, a specified quantity of subcarriers in two edge locations of the first RU are used as guard subcarriers, and a specified quantity of subcarriers in a middle location of the first RU are used as direct current subcarriers. Neither the guard subcarrier nor the direct current subcarrier is used for data transmission of the downlink IoT frame, and the downlink IoT frame is sent to the IoT terminal by using a subcarrier, included in the first RU, other than the guard subcarrier and the direct current subcarrier.

Figure 7:
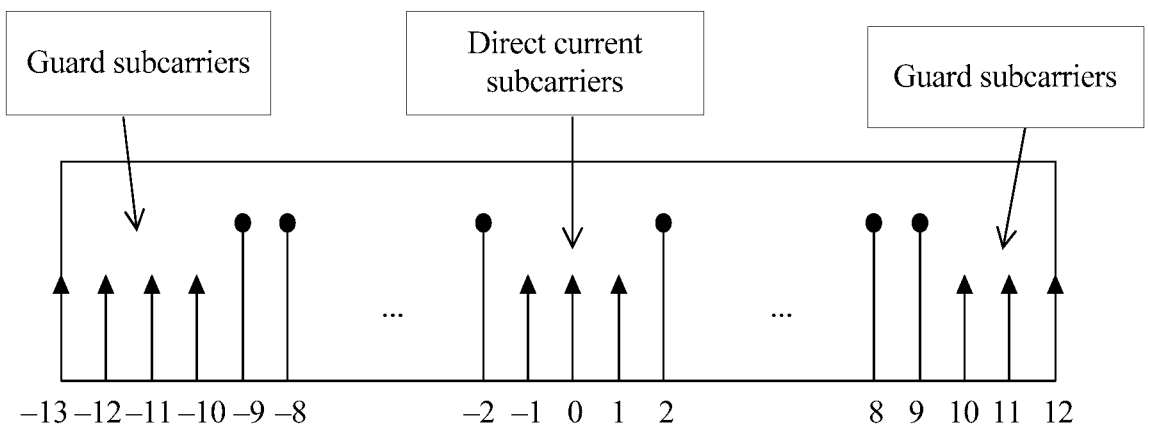
FIG. 7 is a schematic diagram of a subcarrier for transmitting IoT data according to an embodiment of the present disclosure.

For example, when an RU including 26 subcarriers is used as the first RU, only 16 of the 26 subcarriers are used for IoT data transmission. As shown in FIG. 7, if the 26 subcarriers of the first RU are sequentially numbered −13, −12, . . . , 11, and 12 from left to right, subcarriers −13, −12, −11, and −10 and subcarriers 10, 11, and 12 are used as guard subcarriers, and subcarriers −1, 0, and 1 are used as direct current subcarriers. Similarly, when an RU including 52 subcarriers are used as the IoT-RU, only 38 of the 52 subcarriers may be used for IoT data transmission. If the 52 subcarriers of the RU are sequentially numbered −26, −25, . . . , 24, and 25 from left to right, six subcarriers numbered from −26 to −21 and five subcarriers numbered from 21 to 25 are used as IoT guard subcarriers, and subcarriers −1, 0, and 1 are used as IoT direct current subcarriers.

Figures 8, 9:
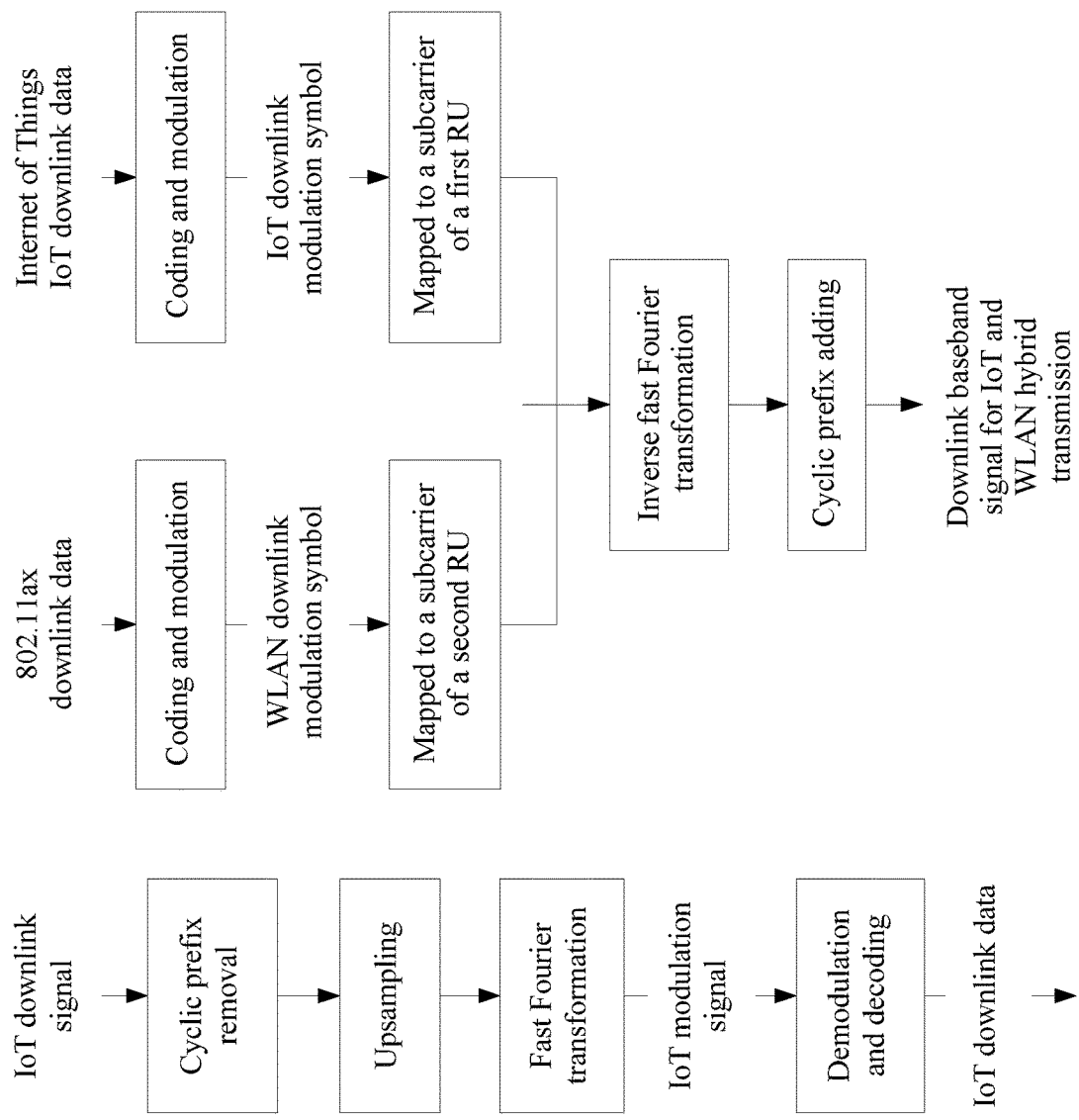
FIG. 8 is a method for generating a data field in an OFDM manner according to an embodiment of the present disclosure.
FIG. 9 is a schematic diagram of a process in which an IoT terminal obtains downlink data in an OFDM manner according to an embodiment of the present disclosure.

In this embodiment of the present disclosure, the data field included in the downlink data frame may be generated by using a method shown in FIG. 8. In FIG. 8, the network side device performs coding and modulation on the downlink data between the network side device and the IoT terminal, that is, IoT downlink data described in FIG. 8, to obtain an IoT downlink modulation symbol. After the IoT downlink modulation symbol is obtained, the IoT downlink modulation symbol is mapped to a subcarrier included in the first RU, that is, a transmission location of the IoT downlink modulation symbol in the data field is a location of the subcarrier included in the first RU. The network side device performs coding and modulation on the downlink data between the network side device and the STA, that is, 802.11ax downlink data shown in FIG. 8, to obtain a WLAN downlink modulation symbol. After the WLAN downlink modulation symbol is obtained, the WLAN downlink modulation symbol is mapped to a subcarrier included in the second RU, that is, a transmission location of the WLAN downlink modulation symbol in the data field is a location of the subcarrier included in the second RU. The network side device performs inverse fast Fourier transformation (IFFT) on a frequency domain signal that includes a subcarrier corresponding to the first RU and a subcarrier corresponding to the second RU, and adds a cyclic prefix (CP) to generate a downlink baseband signal for IoT and WLAN hybrid transmission.

Correspondingly, the IoT terminal may obtain, by using the receive channel, an IoT downlink signal from a downlink received signal including the downlink data frame sent by the network side device. In this embodiment of the present disclosure, a bandwidth of the receive channel of the IoT terminal does not exceed a bandwidth of the first RU. A carrier frequency used by the receive channel of the IoT terminal is set to $f_0+f_r$, where $f_0$ is a carrier frequency of the downlink received signal, and $f_r$ is a frequency difference between a center frequency of the first RU and a zero frequency (for example, a frequency corresponding to a subcarrier numbered 0 in FIG. 7). In this embodiment of the present disclosure, after the downlink received signal passes through the receive channel of the IoT terminal whose operating frequency is set as the carrier frequency, an out-of-band WLAN downlink signal of the first RU is filtered out. Therefore, the IoT terminal may process the IoT downlink signal obtained after the filtering, to obtain the downlink data between the network side device and the IoT terminal.

FIG. 9 is a schematic diagram of a process in which the IoT terminal processes the IoT downlink signal to obtain the downlink data between the network side device and the IoT terminal in an OFDM manner according to an embodiment of the present disclosure. In FIG. 9, the IoT terminal removes a CP from each OFDM symbol of the IoT downlink signal, and performs upsampling and FFT of a corresponding quantity of points, to obtain an IoT modulation signal that is mapped to a subcarrier included in the first RU. For example, 256-point FFT, 512-point FFT, and 1024-point FFT are respectively performed on a 20 MHz channel bandwidth, a 40 MHz channel bandwidth, and an 80 MHz channel bandwidth, to obtain the IoT modulation signal that is mapped to the subcarrier included in the first RU. After the IoT modulation signal is obtained, the IoT terminal performs demodulation and decoding on the IoT modulation signal to obtain the downlink data between the network side device and the IoT terminal.

Implementation 2: The network side device sends the downlink IoT frame to the IoT terminal by using the first RU in a single carrier (Single Carrier, SC) manner.

In this embodiment of the present disclosure, to avoid interference from an out-of-band 802.11ax signal of the first RU to an in-band IoT signal of the first RU, similar to downlink IoT frame transmission in an OFDM manner, a specified quantity of subcarriers at two edge locations of the first RU may be used as guard subcarriers. Different from a case in which the downlink IoT frame transmission in an OFDM manner is easily affected by direct current offset of a receiver, impact of the direct current offset of the receiver is weaker in a single carrier manner. Therefore, a direct current subcarrier does not need to be reserved. In this embodiment of the present disclosure, the downlink IoT frame may be sent to the IoT terminal in a single carrier manner on a frequency band corresponding to a subcarrier, included in the first RU, other than the guard subcarrier.

For example, when an RU including 26 subcarriers is used as the first RU, 20 of the 26 subcarriers may be used for downlink IoT frame transmission in a single carrier manner, and six subcarriers numbered −13, −12, −11, 10, 11, and 12 are used as guard subcarriers. When an RU including 52 subcarriers is used as the first RU, only 42 of the 52 subcarriers may be used for downlink IoT frame transmission in a single carrier manner, and ten subcarriers numbered from −26 to −22 and from 21 to 25 are used as guard subcarriers.

Figure 10:
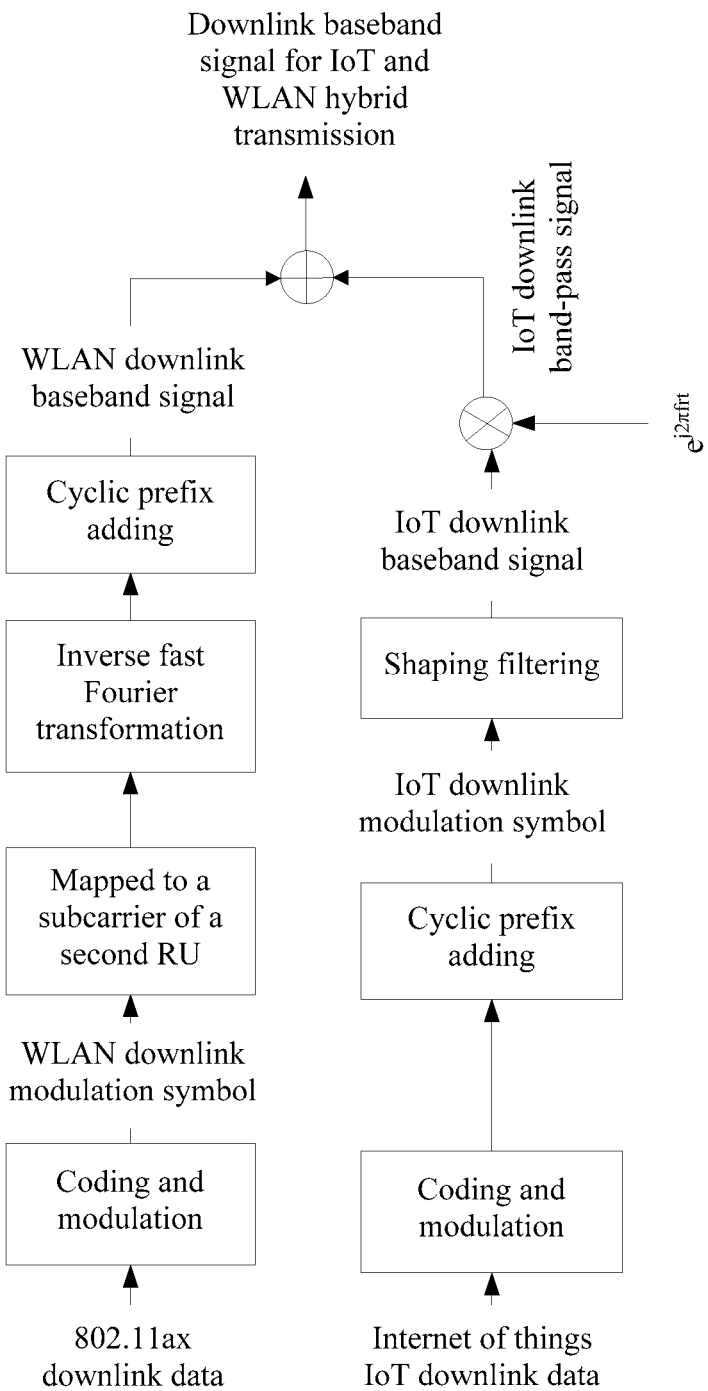
FIG. 10 is a method for generating a data field in a single carrier manner according to an embodiment of the present disclosure.

In this embodiment of the present disclosure, the data field included in the downlink data frame may be generated by using a method shown in FIG. 10. In FIG. 10, the network side device performs coding and modulation on the downlink data between the network side device and the STA, that is, 802.11ax downlink data shown in FIG. 10, to obtain a WLAN downlink modulation symbol. After the WLAN downlink modulation symbol is obtained, the WLAN downlink modulation symbol is mapped to a subcarrier included in the second RU, that is, a transmission location of the WLAN downlink modulation symbol in the data field is a location of the subcarrier included in the second RU. The network side device performs IFFT on a frequency domain signal that includes a subcarrier corresponding to the second RU, and adds a CP to generate a WLAN downlink baseband signal. The network side device performs coding and modulation on the downlink data between the network side device and the IoT terminal, that is, IoT downlink data shown in FIG. 10, and adds a CP to generate an IoT downlink single carrier symbol. The network side device performs waveform shaping filtering on the IoT downlink single carrier symbol to obtain an IoT downlink baseband signal. The network side device performs frequency translation on the IoT downlink baseband signal. That is, as shown in FIG. 10, the IoT downlink baseband signal is multiplied by $e^{j2\pi f_r t}$ to obtain an IoT downlink band-pass signal, where t is a time variable, a center frequency of the IoT downlink band-pass signal is $f_r$, and $f_r$ is a frequency difference between a center frequency of the first RU and a zero frequency. The network side device adds the IoT downlink band-pass signal and the WLAN downlink baseband signal to obtain a downlink baseband signal for IoT and WLAN hybrid transmission.

Correspondingly, in this embodiment of the present disclosure, the IoT terminal may obtain, by using a receive channel, an IoT downlink signal from a downlink received signal including the downlink data frame sent by the network side device. In this embodiment of the present disclosure, a bandwidth of the receive channel of the IoT terminal does not exceed a bandwidth of the first RU. A carrier frequency used by the receive channel of the IoT terminal is set to $f_0+f_r$, where $f_0$ is a carrier frequency of the downlink received signal, and $f_r$ is a frequency difference between a center frequency of the first RU and a zero frequency (for example, a frequency corresponding to a subcarrier numbered 0 in FIG. 7). In this embodiment of the present disclosure, after the downlink received signal passes through the receive channel of the IoT terminal whose operating frequency is set as the carrier frequency, an out-of-band WLAN downlink signal of the first RU is filtered out. Therefore, the IoT terminal may process the IoT downlink signal obtained after the filtering, to obtain the downlink data between the network side device and the IoT terminal.

FIG. 11 is a schematic diagram of a process in which the IoT terminal processes the IoT downlink signal to obtain the downlink data between the network side device and the IoT terminal in a single carrier manner according to an embodiment of the present disclosure. In FIG. 11, the IoT terminal removes a CP from each single carrier symbol of the IoT downlink signal, and performs frequency domain equalization to obtain an IoT modulation signal that is mapped to a frequency band corresponding to the first RU. The IoT terminal performs demodulation and decoding on the IoT modulation signal to obtain the downlink data between the network side device and the IoT terminal.

In this embodiment of the present disclosure, the network side device may simultaneously receive and send an IoT signal and an 802.11ax signal in a frequency domain processing manner instead of a dual mode manner, thereby reducing implementation complexity of IoT communication performed by the network side device.

It should be noted that, in this embodiment of the present disclosure, an IoT downlink single carrier modulation symbol used in single carrier transmission may be modulated in a constant envelope modulation manner such as frequency shift keying (FSK), differential phase shift keying (DPSK), quadrature phase shift keying (QPSK), or Gaussian frequency-shift keying (GFSK) or a higher-order modulation manner such as quadrature amplitude modulation (QAM). Typically, a used waveform shaping filter may be a Gaussian filter, a square root raised cosine filter, or the like.

Optionally, in a specific implementation process of this embodiment of the present disclosure, if the IoT downlink single carrier symbol includes K modulation symbols in addition to a CP, a period of each modulation symbol is $T_1=T_0/K$, where K is a positive integer that does exceed a quantity of subcarriers included in the first RU, $T_1$ is the period of each modulation symbol, and $T_0$ is a length of an OFDM symbol of the WLAN downlink baseband signal. In this embodiment of the present disclosure, a bandwidth (about $1/T_1$) of each IoT downlink single carrier modulation symbol does not exceed the bandwidth of the used first RU. For example, when the first RU is an RU including 26 subcarriers, $$\frac{1}{T_1} = \frac{K}{T_0} = \frac{K}{12.8\ \mu s} \le 26 \times \frac{20\ \text{MHz}}{256}.$$

Therefore, K≤26, that is, each IoT downlink single carrier symbol includes a maximum of 26 modulation symbols in addition to a CP. Similarly, when the first RU is an RU including 52 subcarriers, each IoT downlink single carrier symbol includes a maximum of 52 modulation symbols in addition to a CP.

Optionally, in a specific implementation process of this embodiment of the present disclosure, because the IoT terminal supports a relatively low bandwidth, the first RU is typically an RU including 26 or 52 subcarriers. Therefore, in this embodiment of the present disclosure, at least one basic RU may be set in the first RU on each 20 MHz, 40 MHz, or 80 MHz channel, and the IoT terminal first uses the basic RU to communicate with the network side device.

Specifically, the IoT terminal first receives the IoT downlink signal in the basic RU of the downlink data frame, so as to perform uplink or downlink communication with the network side device such as the AP. The network side device may send channel indication information in the basic RU, where the channel indication information is used to indicate that the IoT terminal is handed over from the basic RU to an RU that is used to send a downlink IoT frame other than the basic RU.

Generally, an amount of data transmitted by a single IoT terminal is relatively small. However, because a large quantity of IoT terminals are deployed in IoT, one IoT-RU, that is, the first RU, needs to simultaneously support communication of multiple IoT terminals. Therefore, in this embodiment of the present disclosure, the IoT data field may be further divided into a time division multiplexing (TDM) structure, that is, the IoT data field includes at least one subframe.

In this embodiment of the present disclosure, the IoT data field includes downlink data of at least two IoT terminals, and downlink data of each IoT terminal occupies at least one subframe, or occupies at least one timeslot of at least one subframe, or occupies at least one subframe and at least one timeslot of the at least one subframe. For example, as shown in FIG. 12, the IoT data field is equally divided into P subframes. Each subframe may be further divided into Q timeslots or certainly, may be not divided into timeslots. In this way, different IoT terminals may use different subframes or different timeslots of the IoT data field. That is, an IoT-RU is used in a Time Division Multiple Access (TDMA) manner, to implement communication between the network side device and multiple IoT terminals. Therefore, in IoT communication, a data processing rate of an IoT terminal is low, IoT terminals are of a large quantity and are widely distributed, a remote IoT terminal can be covered, and multi-user multiplexing of massive IoT terminals can be supported.

A smallest unit of an OFDMA signal in a time domain is an OFDM symbol. OFDM symbols of different time lengths are introduced in 802.11ax, such as one time (1× for short), two times (2× for short), and four times (4× for short), and a cyclic prefix (CP) is not included. The 1× symbol length, the 2× symbol length, and the 4× symbol length are respectively 3.2 microseconds, 6.4 microseconds, and 12.8 microseconds. The 1× and 2× symbol lengths in 802.11ax are mainly used for preambles. For example, to implement backward compatibility with 802.11a, 802.11n, 802.11ac, and other releases, a legacy preamble, an RL-SIG, an RE-SIG-A, and an HE-SIG-B use an OFDM symbol of a 1× symbol length, and 64-point FFT processing is performed in the case of 20 MHz channel bandwidth. The OFDM symbol of a 1× symbol length is corresponding to 64 subcarriers in the frequency domain. A longer OFDM symbol is corresponding to smaller CP overheads. Therefore, to improve efficiency, the data field uses a 4× symbol length, and 256-point FFT processing is performed in the case of 20 MHz channel bandwidth. An OFDM symbol of a 4× symbol length is corresponding to 256 subcarriers in the frequency domain.

It should be noted that, in this embodiment of the present disclosure, in order to help the network side device to perform joint sending and receiving on the downlink baseband signal for IoT and WLAN hybrid transmission, in the data field included in the downlink data frame, a length of an OFDM symbol of the IoT downlink modulation symbol is the same as a length of an OFDM symbol in 802.11ax, that is, CP lengths are the same. In this embodiment of the present disclosure, when the IoT downlink data frame is transmitted in an OFDM manner, the length of the IoT downlink modulation symbol is the same as the length of the OFDM symbol in 802.11ax. In other words, upper boundaries of the IoT downlink modulation symbol and the OFDM symbol in 802.11ax are aligned, that is, a 4× symbol length.

It should be further noted that, when the IoT downlink data frame is transmitted in a single carrier manner, an IoT single carrier symbol may be not aligned with an OFDM symbol of an 802.11ax data field, that is, a length of the IoT single carrier symbol may be different from that of the OFDM symbol of the 802.11ax data field, and a CP length of the IoT single carrier symbol may also be different from that of the OFDM symbol.

According to the IoT communication method provided in this embodiment of the present disclosure, the network side device determines that the terminal device that performs downlink data transmission includes the IoT terminal, and the network side device sends the downlink data frame. In the downlink data frame, frequency division multiplexing is performed on the data field of the 802.11ax data frame by using the downlink IoT frame, so that the network side device can schedule and coordinate the IoT terminal, thereby reducing an interference risk in IoT transmission. In a process of transmitting the downlink data frame, the STA parses a legacy preamble and a HEW preamble to obtain information about timing synchronization, frequency synchronization, and channel estimation. The IoT terminal parses a preamble part of the downlink IoT frame to obtain information about timing synchronization, frequency synchronization, and channel estimation performed by the IoT terminal, without a need to parse the preamble part in 802.11ax, so that the IoT terminal and the STA do not interfere with each other in a process of performing frequency division on and sharing a channel resource in 802.11ax. In the foregoing manner, the IoT terminal does not need to support a high bandwidth of 20/40/80 MHz, and a narrow-band IoT terminal with a constrained bandwidth is effectively supported, thereby meeting a requirement of low complexity and low power consumption of the IoT device.

Based on the implementation method for sending the downlink data frame by the network side device provided in the foregoing embodiment, an embodiment of the present disclosure provides another IoT communication method.

FIG. 13 is an implementation flowchart of a second IoT communication method according to an embodiment of the present disclosure. A method procedure shown in FIG. 13 is executed by an IoT terminal. As shown in FIG. 13, an implementation process of the IoT communication method includes the following steps.

S201: The IoT terminal obtains a downlink IoT frame from a downlink received signal.

In this embodiment of the present disclosure, the downlink received signal includes a downlink data frame sent by a network side device. The downlink data frame includes a legacy preamble, a HEW preamble, and a data field. The legacy preamble and the HEW preamble are used for communication between the network side device and a station STA, and a subcarrier resource that is corresponding to the data field in a frequency domain includes at least one RU. The at least one RU is used to send a downlink IoT frame, and the downlink IoT frame includes an IoT preamble and an IoT data field. The IoT preamble is used to transmit physical layer control information of the downlink IoT frame, and the IoT data field is used to transmit downlink data between the network side device and the IoT terminal.

In this embodiment of the present disclosure, the subcarrier resource that is corresponding to the data field of the downlink data frame in the frequency domain sent by the network side device may further include at least one other RU different from the RU that is used to transmit an IoT downlink data frame, and the at least one other RU is used to transmit downlink data between the network side device and the STA.

In this embodiment of the present disclosure, for ease of description, the RU that is used to transmit the IoT downlink data frame is referred to as a first RU, and the RU that is used to transmit the downlink data between the network side device and the STA is referred to as a second RU. In this embodiment of the present disclosure, the first RU is used by the network side device to send the downlink IoT frame to the IoT terminal, and the second RU is used by the network side device to send the downlink data between the network side device and the STA to the STA.

In this embodiment of the present disclosure, a bandwidth of a receive channel of the IoT terminal does not exceed a bandwidth of the first RU. A carrier frequency used by the receive channel of the IoT terminal is $f_0+f_r$, where $f_0$ is a carrier frequency of the downlink received signal, and $f_r$ is a frequency difference between a center frequency of the first RU and a zero frequency.

In this embodiment of the present disclosure, for a specific structure of the downlink data frame included in the downlink received signal, refer to related description in FIG. 6 in the foregoing embodiment. Details are not described herein again.

S202: The IoT terminal processes the downlink IoT frame to obtain downlink data between a network side device and the IoT terminal.

In this embodiment of the present disclosure, for a specific implementation process in which the IoT terminal processes the downlink IoT frame to obtain the downlink data between the network side device and the IoT terminal, refer to related description in FIG. 9 and FIG. 11 in the foregoing embodiment. Details are not described herein again.

According to the IoT communication method provided in this embodiment of the present disclosure, the IoT downlink signal received by the IoT terminal includes the downlink data frame sent by the network side device, and frequency division multiplexing is performed on the downlink IoT frame in the downlink data frame and a data field of an 802.11ax data frame, so that the IoT terminal can be scheduled and coordinated by the network side device, thereby reducing an interference risk in IoT transmission. In a process of transmitting the downlink data frame, the STA parses a legacy preamble and a HEW preamble to obtain information about timing synchronization, frequency synchronization, and channel estimation. The IoT terminal parses a preamble part of the downlink IoT frame to obtain information about timing synchronization, frequency synchronization, and channel estimation performed by the IoT terminal, without a need to parse a preamble part in 802.11ax, so that the IoT terminal and the STA do not interfere with each other in a process of performing frequency division on and sharing a channel resource in 802.11ax. In the foregoing manner, the IoT terminal does not need to support a high bandwidth of 20/40/80 MHz, and a narrow-band IoT terminal with a constrained bandwidth is effectively supported, thereby meeting a requirement of low complexity and low power consumption of the IoT device.

The foregoing embodiments of the present disclosure mainly describe a process in which the network side device such as the AP sends downlink data and the IoT terminal receives the downlink data. The following embodiments of the present disclosure will describe a process in which the IoT terminal sends uplink data and the network side device such as the AP receives the uplink data in an IoT communication manner provided in the embodiments of the present disclosure.

Figure 14:
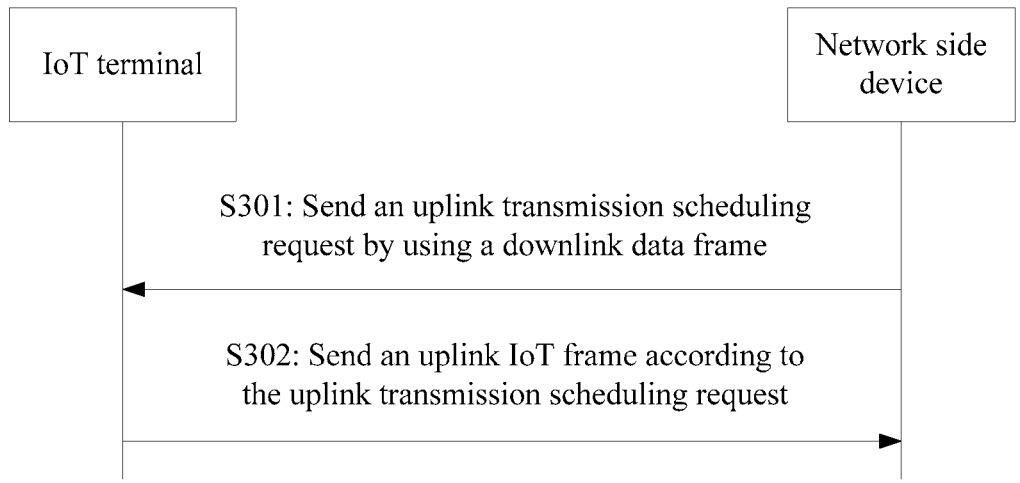
FIG. 14 is an implementation flowchart of a third IoT communication method according to an embodiment of the present disclosure.

FIG. 14 is an implementation flowchart of a third IoT communication manner according to an embodiment of the present disclosure. A method procedure shown in FIG. 14 is executed by an IoT terminal, and the IoT terminal sends uplink data. As shown in FIG. 14, the method procedure includes the following steps.

S301: The IoT terminal receives an uplink transmission scheduling request sent by a network side device.

In this embodiment of the present disclosure, when the IoT terminal sends uplink data to the network side device such as an AP, the network side device needs to deliver the uplink transmission scheduling request. The uplink transmission scheduling request is used to schedule the IoT terminal to send an uplink IoT frame, so as to perform uplink data transmission. The uplink IoT frame is located in a data field of an uplink data frame, a subcarrier resource that is corresponding to the data field of the uplink data frame in a frequency domain includes at least one RU, and the at least one RU is used to send the uplink IoT frame.

In this embodiment of the present disclosure, the uplink transmission scheduling request may include information such as an identifier of the IoT terminal that is scheduled to perform uplink data transmission, an uplink transmission resource allocated to the IoT terminal that performs uplink data transmission, and a coding and modulation manner. By receiving the uplink transmission scheduling request, the IoT terminal that is scheduled to perform uplink data transmission learns whether the network side device allows the IoT terminal that receives the uplink transmission scheduling request to send the uplink data, and obtains information such as a transmission resource and a transmission format used for transmitting the uplink data, so that the IoT terminal that is scheduled to perform uplink data transmission sends the uplink data according to the information.

In this embodiment of the present disclosure, the uplink transmission scheduling request may be sent by using a downlink data frame. The downlink data frame includes a legacy preamble, a HEW preamble, and a data field. The legacy preamble and the HEW preamble are used for communication between the network side device and a station STA, and a subcarrier resource that is corresponding to the data field in the frequency domain includes at least one RU that is used to send the uplink transmission scheduling request. In this embodiment of the present disclosure, the RU that is used to send the uplink transmission scheduling request may also be referred to as a first RU.

It should be noted that, in this embodiment of the present disclosure, the uplink transmission scheduling request sent by the network side device may be a separate downlink trigger frame, and the downlink trigger frame may use a frame structure of the downlink data frame shown in FIG. 6. The network side device may further send the downlink data and the downlink trigger frame to schedule the IoT terminal to perform uplink data transmission. That is, in addition to sending the uplink transmission scheduling request, the first RU may be used by the network side device to send the downlink data to the IoT terminal. The IoT terminal corresponding to the downlink data may be the IoT terminal that is scheduled to perform uplink data transmission, or may be another IoT terminal.

S302: The IoT terminal sends an uplink IoT frame according to the uplink transmission scheduling request.

In this embodiment of the present disclosure, the uplink IoT frame sent by the IoT terminal includes an IoT preamble and an IoT data field. The IoT preamble is used to transmit physical layer control information of the uplink IoT frame, and the IoT data field is used to transmit uplink data between the network side device and the IoT terminal.

The physical layer control information that is of the uplink IoT frame and that is transmitted by the IoT preamble includes one or any combination of the following sequences: a synchronization sequence used by the network side device to obtain timing synchronization and frequency synchronization of the uplink IoT frame; or a training sequence used by the network side device to obtain channel estimation required for demodulating the uplink IoT frame.

Specifically, in this embodiment of the present disclosure, the uplink IoT frame is located in the data field of the uplink data frame, and the uplink data frame includes a legacy preamble, a HEW preamble, and a data field. The legacy preamble and the HEW preamble are used for communication between the network side device and the station STA, and a subcarrier resource that is corresponding to the data field in the frequency domain includes a third RU. In this embodiment of the present disclosure, the uplink IoT frame is located in the third RU. In other words, the uplink IoT frame is sent by using the third RU in this embodiment of the present disclosure.

Therefore, in this embodiment of the present disclosure, the uplink transmission scheduling request further includes location information of the uplink IoT frame sent by the IoT terminal, and the location information includes a start moment of the data field of the uplink data frame and an identifier of the third RU for sending the uplink IoT frame. In this way, the IoT terminal can send the uplink IoT frame in the third RU at the start moment of the data field of the uplink data frame according to the uplink transmission scheduling request.

Figure 15:
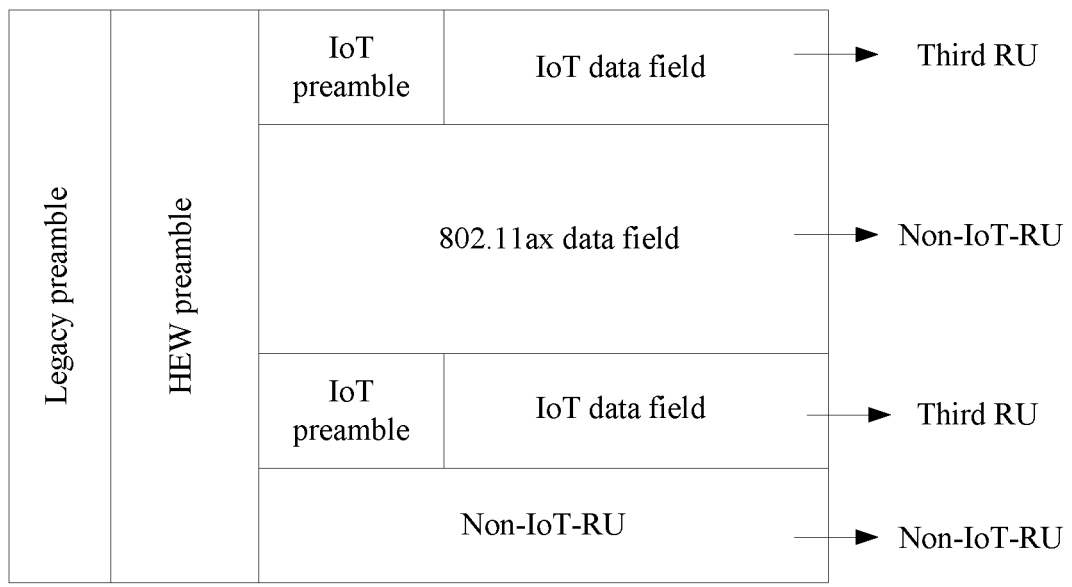
FIG. 15 is a schematic structural diagram of an uplink data frame according to an embodiment of the present disclosure.
Figure 16:
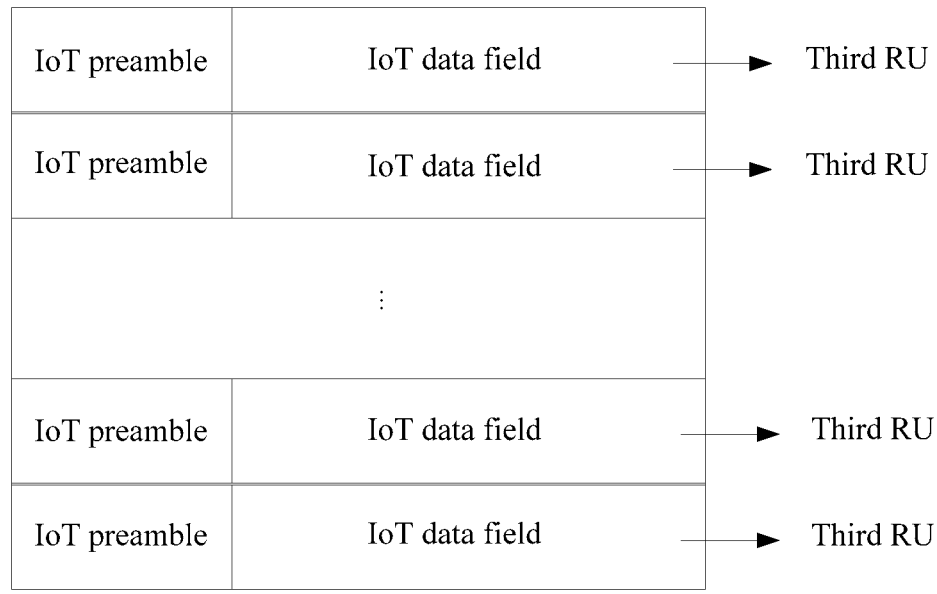
FIG. 16 is another schematic structural diagram of an uplink data frame according to an embodiment of the present disclosure.

For a structure of the uplink data frame provided in this embodiment of the present disclosure, refer to FIG. 15 and FIG. 16. In FIG. 15 and FIG. 16, the third RU is an RU that is used to transmit the uplink data between the network side device and the IoT terminal, and may also be referred to as an IoT-RU. A non-IoT-RU is an RU that is used to transmit the uplink data between the network side device and the STA.

In a structure of an uplink data frame shown in FIG. 15, the IoT terminal and the STA perform frequency division multiplexing on a subcarrier resource in a data field of the data frame. The uplink data frame includes a legacy preamble, a HEW preamble, and a data field. The legacy preamble shown in FIG. 15 includes fields such as the L-STF, the L-LTF, and the L-SIG shown in FIG. 2, and the HEW preamble shown in FIG. 15 includes fields such as the RL-SIG, the HE-SIG-A, the HE-SIG-B, the HE-STF, and the HE-LTF shown in FIG. 2. That is, the legacy preamble and the HEW preamble included in the uplink data frame in this embodiment of the present disclosure have same functions and same structures as a legacy preamble and a HEW preamble in 802.11ax, and both are used for communication between the network side device and the STA.

The data field included in the uplink data frame shown in FIG. 15 in this embodiment of the present disclosure is different from the data field of the 802.11ax data frame structure shown in FIG. 2. In this embodiment of the present disclosure, a subcarrier resource that is corresponding to the data field of the uplink data frame shown in FIG. 15 in the frequency domain includes a third RU and a non-IoT-RU. The third RU is used to send the uplink IoT frame. The non-IoT-RU is used by the STA to send the uplink data between the network side device and the STA to the network side device.

In this embodiment of the present disclosure, the uplink IoT frame located in the third RU includes an IoT preamble and an IoT data field, the IoT preamble is used to transmit the physical layer control information of the uplink IoT frame, and the IoT data field is used to transmit the uplink data between the network side device and the IoT terminal.

The physical layer control information that is of the uplink IoT frame and that is transmitted by the IoT preamble includes one or any combination of the following sequences:

a synchronization sequence used by the network side device to obtain timing synchronization and frequency synchronization of the uplink IoT frame; or a training sequence used by the network side device to obtain channel estimation required for demodulating the uplink IoT frame.

In this embodiment of the present disclosure, for the uplink IoT frame located in the third RU, the network side device parses a preamble part of the uplink IoT frame to obtain information about timing synchronization, frequency synchronization, or channel estimation performed with the IoT terminal. That is, the IoT terminal needs to send only a narrow-band uplink IoT frame, and does not need to support a high bandwidth of 20/40/80 MHz. Therefore, in the present disclosure, a narrow-band IoT terminal with a constrained bandwidth can be effectively supported, thereby meeting a requirement of low complexity and low power consumption of the IoT device.

In a structure of an uplink data frame shown in FIG. 16, all subcarrier resources of a data field are used to transmit an uplink IoT frame. As shown in FIG. 16, when all RUs of the data field are used to transmit the uplink IoT frame, the uplink data frame may not include a legacy preamble or a HEW preamble, and the data field includes a third RU.

In this embodiment of the present disclosure, the IoT terminal receives an uplink trigger request, that is, after sending a downlink data frame by using a structure of the downlink data frame, the IoT terminal starts to transmit an uplink data frame after a preset interval. The preset interval is supposed to be greater than a time required for demodulating and decoding the downlink data frame by the scheduled IoT terminal and for preparing transmission of the uplink data frame (for example, conversion of a radio frequency channel in uplink and downlink transmission).

Figure 17:
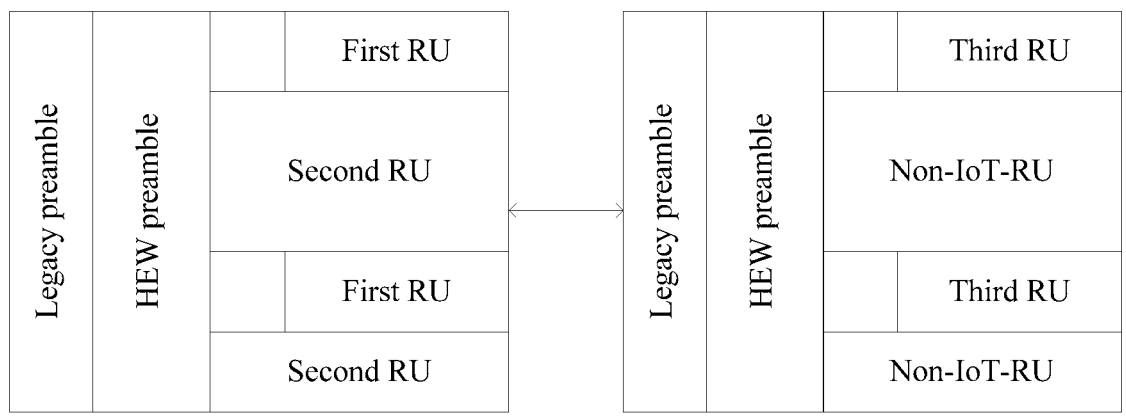
FIG. 17 is a schematic structural diagram of a physical layer frame for uplink data transmission according to an embodiment of the present disclosure.
Figure 18:
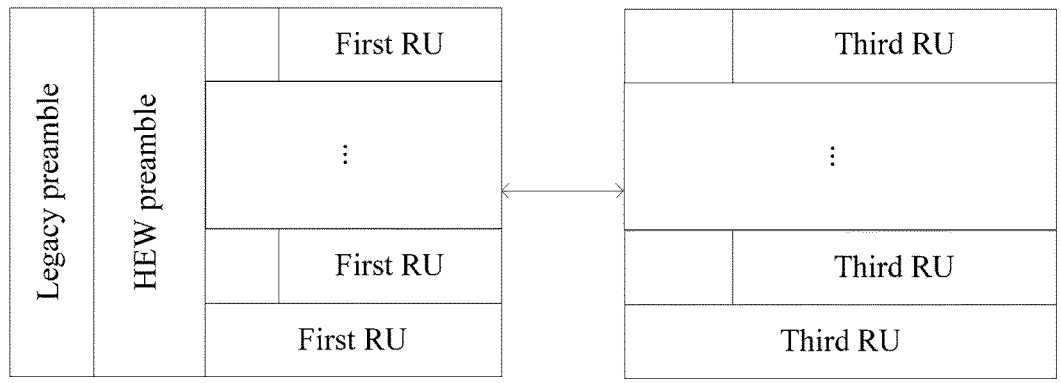
FIG. 18 is another schematic structural diagram of a physical layer frame for uplink data transmission according to an embodiment of the present disclosure.

In this embodiment of the present disclosure, FIG. 17 shows a physical layer frame structure of uplink data transmission corresponding to sending an uplink IoT frame by using the uplink data frame shown in FIG. 15. FIG. 18 shows a physical layer frame structure of uplink data transmission corresponding to sending an uplink IoT frame by using the uplink data frame shown in FIG. 16.

In this embodiment of the present disclosure, the following specifically describes an implementation process in which the IoT terminal sends the uplink IoT frame by using the third RU in the uplink data frame.

Implementation 1: The IoT terminal sends the uplink IoT frame by using the third RU in an OFDM manner.

In this embodiment of the present disclosure, to avoid interference from an out-of-band 802.11ax signal of the third RU to an in-band IoT signal of the third RU, the IoT terminal specifically sends the uplink IoT frame in the following manner:

A: A specified quantity of subcarriers in two edge locations of the third RU are used as guard subcarriers.

B: A specified quantity of subcarriers in a middle location of the third RU are used as direct current subcarriers.

C: The uplink IoT frame is sent to the network side device on a subcarrier, included in the third RU, other than the guard subcarrier and the direct current subcarrier.

Figure 19:
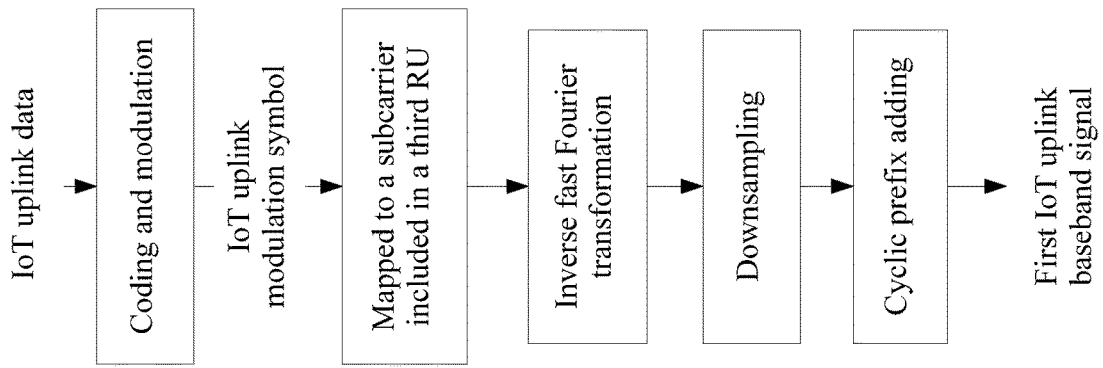
FIG. 19 is a schematic diagram of a process in which an uplink IoT frame is sent in an OFDM manner according to an embodiment of the present disclosure.

Optionally, in this embodiment of the present disclosure, the uplink IoT frame may be sent by using the third RU and by using a method shown in FIG. 19. In FIG. 19, the IoT terminal performs coding and modulation on the uplink data between the network side device and the IoT terminal, that is, IoT uplink data shown in FIG. 19, to obtain an IoT uplink modulation symbol, and maps the IoT uplink modulation symbol to a subcarrier included in the third RU. The IoT terminal performs IFFT and downsampling on a frequency domain signal that includes a subcarrier corresponding to the third RU, adds a CP to obtain a first IoT uplink baseband signal, and sends the first IoT uplink baseband signal by using an uplink transmit channel.

In this embodiment of the present disclosure, a carrier frequency of the uplink transmit channel for transmitting the first IoT uplink baseband signal is $f_0 + f_r$, where $f_0$ is a carrier frequency of a channel for transmitting the uplink data frame in which the third RU is located, and $f_r$ is a frequency difference between a center frequency of the third RU and a zero frequency.

Manner 2: The IoT terminal sends the uplink IoT frame by using the third RU in a single carrier manner.

In this embodiment of the present disclosure, to avoid interference from an out-of-band 802.11ax signal of the third RU to an in-band IoT signal of the third RU, the IoT terminal specifically sends the uplink IoT frame in the following manner:

A: The IoT terminal uses a specified quantity of subcarriers in two edge locations of the third RU as guard subcarriers.

B: The IoT terminal sends the uplink IoT frame to the network side device in a single carrier manner on a frequency band corresponding to a subcarrier, included in the third RU, other than the guard subcarrier.

Figure 20:
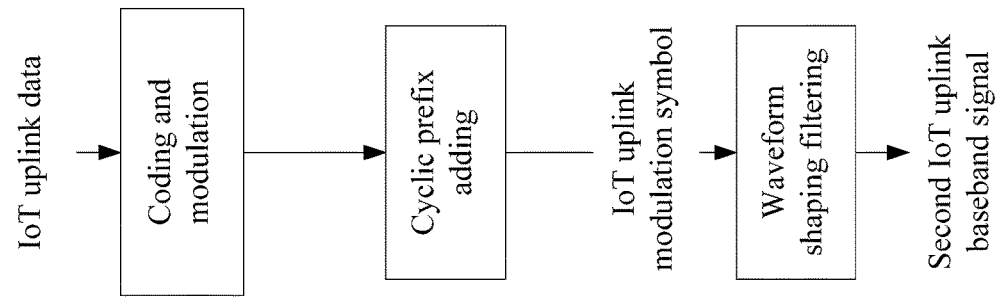
FIG. 20 is a schematic diagram of a process in which an uplink IoT frame is sent in a single carrier manner according to an embodiment of the present disclosure.

In this embodiment of the present disclosure, the IoT terminal may send the uplink IoT frame in a single carrier manner and in a manner shown in FIG. 20. In FIG. 20, the IoT terminal performs coding and modulation on the uplink data between the network side device and the IoT terminal, where the uplink data between the network side device and the IoT terminal is IoT uplink data shown in FIG. 20; and adds a cyclic prefix to generate an IoT uplink single carrier symbol. The IoT terminal performs waveform shaping filtering on the IoT uplink single carrier symbol to obtain a second IoT uplink baseband signal. The IoT terminal sends the second IoT uplink baseband signal by using an uplink transmit channel.

In this embodiment of the present disclosure, a carrier frequency of the uplink transmit channel is $f_0 + f_r$, where $f_0$ is a carrier frequency of a channel for transmitting the uplink data frame in which the third RU is located, and $f_r$ is a frequency difference between a center frequency of the third RU and a zero frequency.

In this embodiment of the present disclosure, in order to help the network side device such as the AP to perform joint receiving on the IoT signal and the 802.11AX signal, in a process of sending the uplink IoT frame in a single carrier manner, a length of the IoT uplink single carrier symbol is the same as a length of an OFDM symbol in 802.11ax. That is, the IoT uplink single carrier symbol and an OFDM symbol of a WLAN uplink baseband signal sent by the STA use CPs of a same length, and a length of the IoT uplink single carrier symbol is the same as a length of the OFDM symbol of the WLAN uplink baseband signal sent by the STA. In other words, as shown in FIG. 21, upper boundaries of the IoT uplink single carrier symbol and the OFDM symbol in 802.11ax are aligned, that is, a 4× symbol length.

It should be noted that, in this embodiment of the present disclosure, when the uplink IoT frame is transmitted in an OFDM manner, a length of the IoT uplink modulation symbol is the same as the length of the OFDM symbol in 802.11ax. In other words, upper boundaries of the IoT uplink modulation symbol and the OFDM symbol in 802.11ax are aligned, that is, a 4× symbol length.

Figure 21:
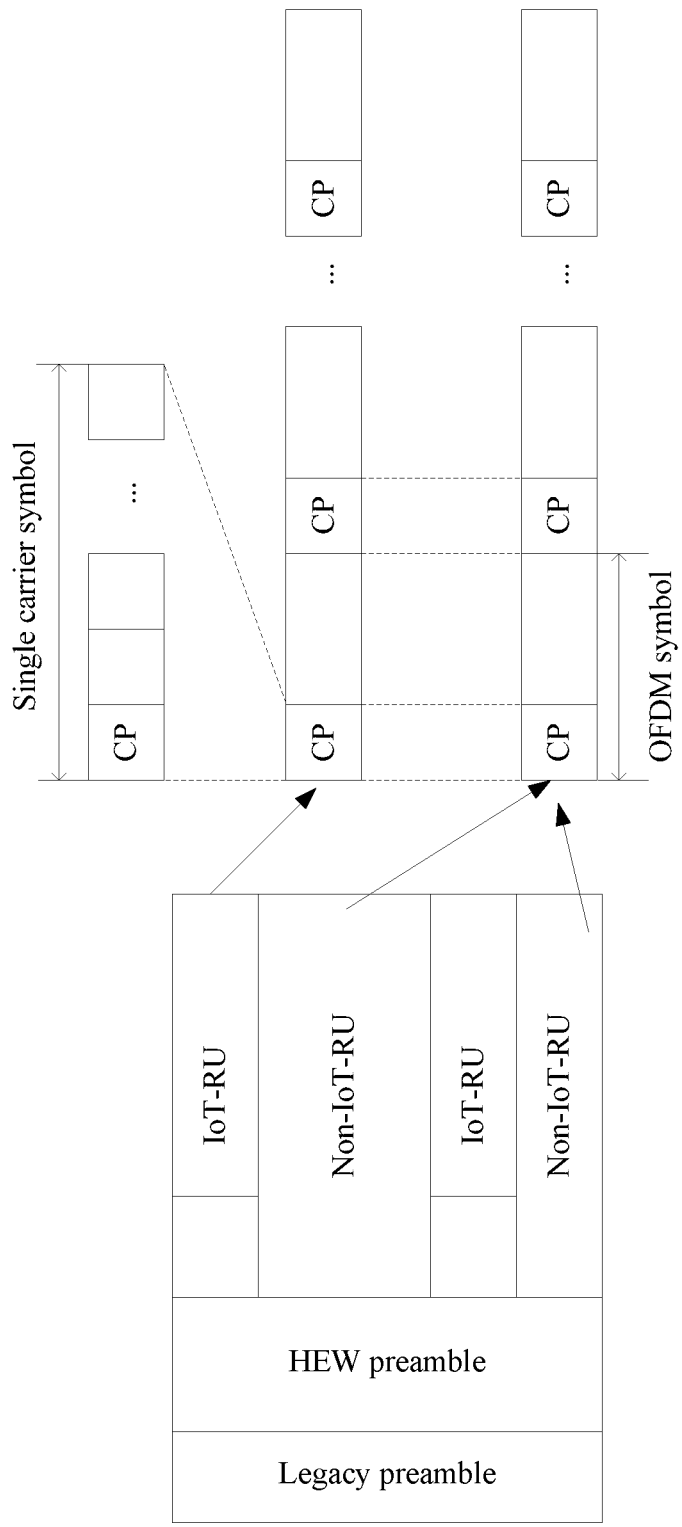
FIG. 21 is a schematic diagram of an uplink single carrier symbol and an 802.11ax OFDM symbol that are of a same length according to an embodiment of the present disclosure.

It should be noted that, in FIG. 21 in this embodiment of the present disclosure, an IoT-RU is the third RU that is used to transmit the uplink data between the IoT terminal and the network side device, and a non-IoT-RU is the RU that is used to transmit the uplink data between the STA and the network side device.

It should be further noted that, in this embodiment of the present disclosure, a manner of sending the uplink IoT frame by the IoT terminal by using the third RU is not limited to a manner of sending a downlink IoT frame by the network side device. For example, if the network side device sends the downlink IoT frame in an OFDM manner, the IoT terminal may send the uplink IoT frame in a single carrier manner.

Optionally, in this embodiment of the present disclosure, the IoT uplink single carrier symbol includes K modulation symbols, and a period of each modulation symbol is $T_1=T_0/K$, where K is a positive integer that does not exceed a quantity of subcarriers included in the third RU, $T_1$ is the period of each modulation symbol, and $T_0$ is the length of the OFDM symbol of the WLAN uplink baseband signal sent by the STA.

Figure 22:
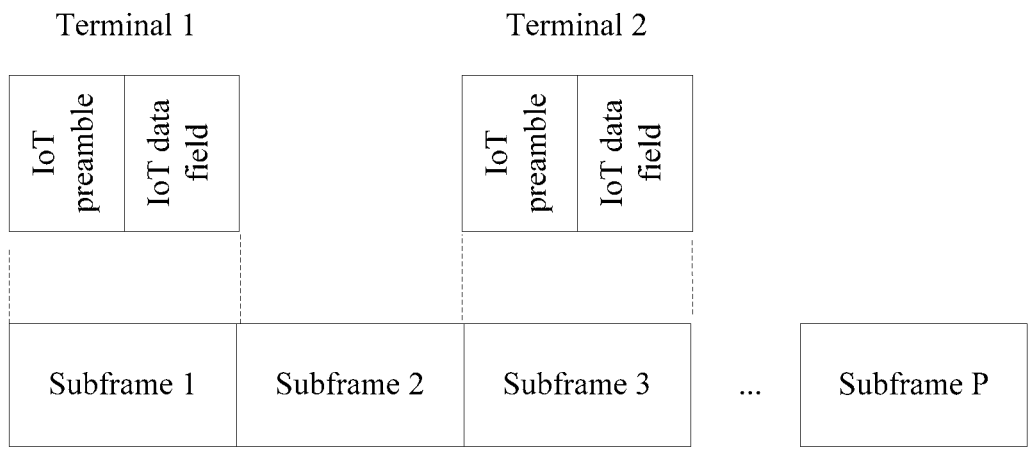
FIG. 22 is a schematic structural diagram of time division multiplexing of an uplink IoT frame according to an embodiment of the present disclosure.

Optionally, in a specific process of implementing the IoT communication method provided in this embodiment of the present disclosure, the uplink IoT frame includes uplink IoT subframes sent by at least two IoT terminals, and the uplink IoT subframe sent by each IoT terminal includes an IoT preamble and an IoT data field. In other words, the uplink IoT frame in the uplink data frame includes at least one subframe. Each IoT terminal uses the at least one subframe to send the uplink IoT subframe of each IoT terminal, and the uplink IoT subframe sent by each IoT terminal includes an IoT preamble and an IoT data field. For example, as shown in FIG. 22, the uplink IoT frame is equally divided into P subframes, and different IoT terminals may use different subframes of the uplink IoT frame. That is, an IoT-RU is used in a TDMA manner, to implement communication between the network side device and multiple IoT terminals. Therefore, in IoT communication, a data processing rate of an IoT terminal is low, IoT terminals are of a large quantity and are widely distributed, a remote IoT terminal can be covered, and multi-user multiplexing of massive IoT terminals can be supported.

It should be noted that, in this embodiment of the present disclosure, the P subframes of the uplink IoT frame shown in FIG. 22 are obtained by means of equal division, or subframes included in the uplink IoT frame may be not obtained by means of equal division. This is not limited in a specific implementation.

Optionally, because a constant envelope modulation method has a maximum peak to average power ratio (PAPR), the IoT terminal can implement low-voltage power supply, a transmit power is relatively small, and an uplink PAPR can be reduced as much as possible. In this embodiment of the present disclosure, the constant envelope modulation method may be used in a process of sending the uplink IoT frame by the IoT terminal. For example, GFSK modulation is used.

It should be noted that, this embodiment of the present disclosure is not limited to the constant envelope modulation method. For example, a QAM modulation manner may be used. A PAPR of the QAM modulation manner is slightly greater than a PAPR of constant envelope modulation, but is far less than a PAPR of an OFDM manner, and therefore, a relatively high transmission rate can be implemented.

According to the IoT communication method provided in this embodiment of the present disclosure, the uplink IoT frame sent by the IoT terminal is located in the third RU of the uplink data frame, and in the uplink data frame, the IoT terminal and the STA perform frequency division multiplexing on a data field of an 802.11ax data frame, so that the IoT terminal can be scheduled and coordinated by the network side device, thereby reducing an interference risk in IoT communication. In a process of transmitting the uplink data frame, the IoT terminal needs to send only a narrow-band uplink IoT frame. The IoT terminal and the STA perform frequency division multiplexing on a channel resource in 802.11ax, and do not interfere with each other. In the foregoing manner, the IoT terminal does not need to support a high bandwidth of 20/40/80 MHz, and a narrow-band IoT terminal with a constrained bandwidth is effectively supported, thereby meeting a requirement of low complexity and low power consumption of the IoT device.

Figure 23:
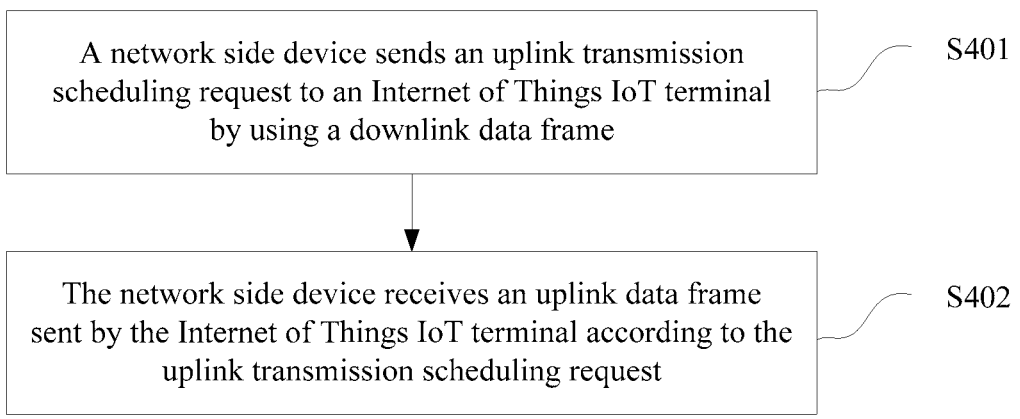
FIG. 23 is an implementation flowchart of a fourth IoT communication method according to an embodiment of the present disclosure.

Based on the foregoing embodiment in which the IoT terminal sends the uplink data, an embodiment of the present disclosure further provides an IoT communication method. FIG. 23 is an implementation flowchart of a fourth IoT communication method according to an embodiment of the present disclosure. The method in FIG. 23 is executed by a network side device. As shown in FIG. 23, the method includes the following steps.

S401: The network side device sends an uplink transmission scheduling request to an IoT terminal.

In this embodiment of the present disclosure, the uplink transmission scheduling request is used to schedule the IoT terminal to send an uplink IoT frame, so as to perform uplink data transmission.

In this embodiment of the present disclosure, the uplink transmission scheduling request may be sent by using a downlink data frame. The downlink data frame includes a legacy preamble, a HEW preamble, and a data field. The legacy preamble and the HEW preamble are used for communication between the network side device and a station STA, and a subcarrier resource that is corresponding to the data field in a frequency domain includes at least one RU that is used to send the uplink transmission scheduling request. In this embodiment of the present disclosure, the RU that is used to send the uplink transmission scheduling request may also be referred to as a first RU.

S402: The network side device obtains an uplink IoT frame sent by the IoT terminal according to the uplink transmission scheduling request.

The uplink IoT frame is located in a data field of an uplink data frame, a subcarrier resource that is corresponding to the data field of the uplink data frame in the frequency domain includes at least one RU, and the at least one RU is used to send the uplink IoT frame. For ease of description, in this embodiment of the present disclosure, an RU that is used to send the uplink IoT frame is referred to as a third RU, or certainly, may be referred to as an IoT-RU.

The uplink IoT frame includes an IoT preamble and an IoT data field, the IoT preamble is used to transmit physical layer control information of the uplink IoT frame, and the IoT data field is used to transmit uplink data between the network side device and the IoT terminal.

Figure 24:
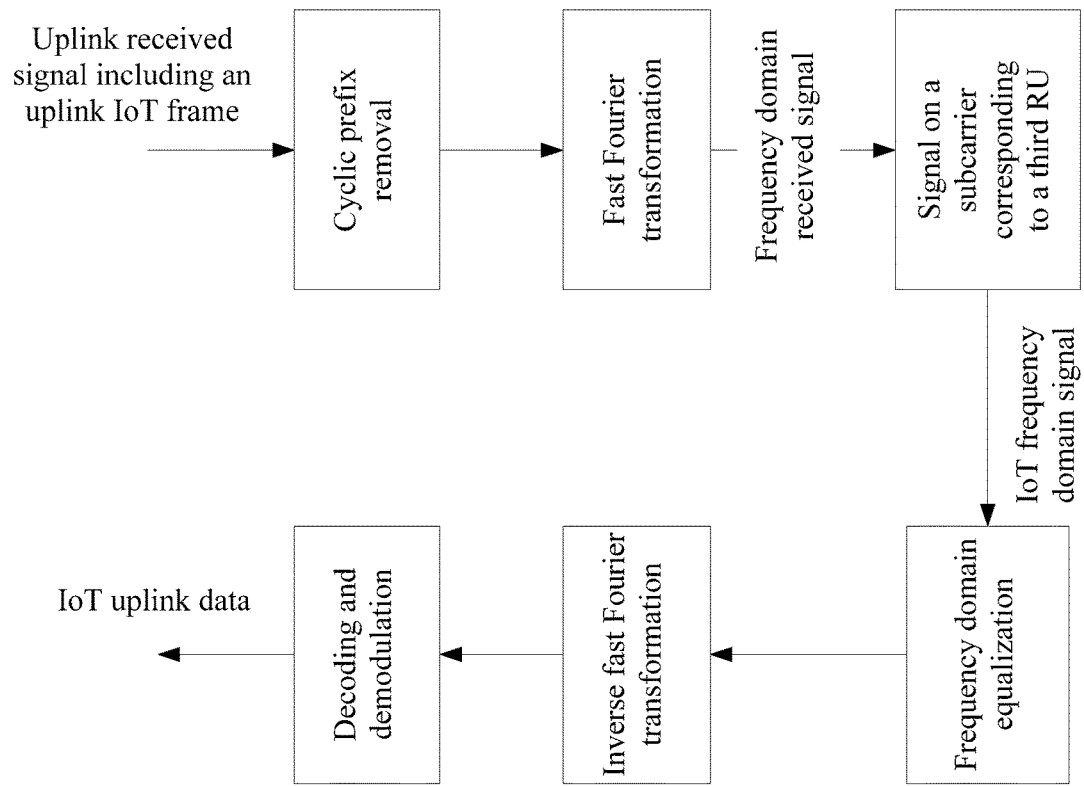
FIG. 24 is a schematic diagram of a process in which a network side device receives an uplink data frame according to an embodiment of the present disclosure.

Specifically, the network side device may receive, in a manner shown in FIG. 24, an uplink data frame sent by the IoT terminal according to the uplink transmission scheduling request. In FIG. 24, the network side device obtains an uplink received signal. The uplink received signal includes the uplink IoT frame sent by the IoT terminal, and the uplink IoT frame is located in the third RU of the uplink data frame. The network side device removes a CP from the uplink received signal, and performs FFT to obtain a frequency domain received signal. The network side device obtains a signal on a subcarrier corresponding to the third RU from the frequency domain received signal to obtain an IoT frequency domain signal. The network side device performs frequency domain equalization, IFFT, and demodulation and decoding on the IoT frequency domain signal to obtain the uplink data that is between the network side device and the IoT terminal and that is sent by using the IoT frame.

According to the IoT communication method provided in this embodiment of the present disclosure, the network side device sends the uplink scheduling request to the IoT terminal by using the downlink data frame, and frequency division multiplexing is performed on the downlink IoT frame in the downlink data frame and a data field of an 802.11ax data frame, so that the network side device can schedule and coordinate the IoT terminal, thereby reducing an interference risk in IoT transmission. The network side device receives the uplink data frame sent by the IoT terminal according to the uplink transmission scheduling request. The uplink data frame includes a legacy preamble, a HEW preamble, and a data field, and the data field includes a third RU that is used to transmit uplink data between the IoT terminal and the network side device. Therefore, in this embodiment of the present disclosure, the IoT terminal needs to send only a narrow-band uplink IoT frame. The IoT terminal and the STA perform frequency division multiplexing on a channel resource in 802.11ax, and do not interfere with each other. In the foregoing manner, the IoT terminal does not need to support a high bandwidth of 20/40/80 MHz, and a narrow-band IoT terminal with a constrained bandwidth is effectively supported, thereby meeting a requirement of low complexity and low power consumption of the IoT device.

In this embodiment of the present disclosure, the network side device sends a downlink data frame, and the downlink data frame includes a legacy preamble, a HEW preamble, and a data field. The legacy preamble and the HEW preamble are used for communication between the network side device and the STA. A subcarrier resource that is corresponding to the data field in the frequency domain includes a first RU and a second RU. The first RU is used to send a downlink IoT frame to the IoT terminal, where the downlink IoT frame includes an IoT preamble and an IoT data field, the IoT preamble is used to transmit physical layer control information of the downlink IoT frame, and the IoT data field is used to transmit downlink data between the network side device and the IoT terminal. The second RU is used to send downlink data between the network side device and the STA to the STA.

The STA parses the legacy preamble and the HEW preamble by using the downlink data frame to obtain information about timing synchronization, frequency synchronization, channel estimation, or the like performed by the STA, and obtains the downlink data between the network side device and the STA by using the second RU in the data field.

The IoT terminal parses the IoT preamble by using the downlink data frame to obtain fields of timing synchronization, frequency synchronization and channel estimation performed by the IoT terminal, and obtains, by using the first RU in the data field, the downlink data sent by the network side device.

In this embodiment of the present disclosure, the network side device may further send the uplink transmission scheduling request to the IoT terminal, and schedule the IoT terminal to send uplink data. In this embodiment of the present disclosure, the network side device receives uplink data by using an uplink data frame, where the uplink data frame includes a legacy preamble, a HEW preamble, and a data field. The legacy preamble and the HEW preamble are used for communication between the network side device and the station STA. A subcarrier resource that is corresponding to the data field in the frequency domain includes a third RU, and the third RU is used to transmit the uplink data between the network side device and the IoT terminal.

Figure 25:
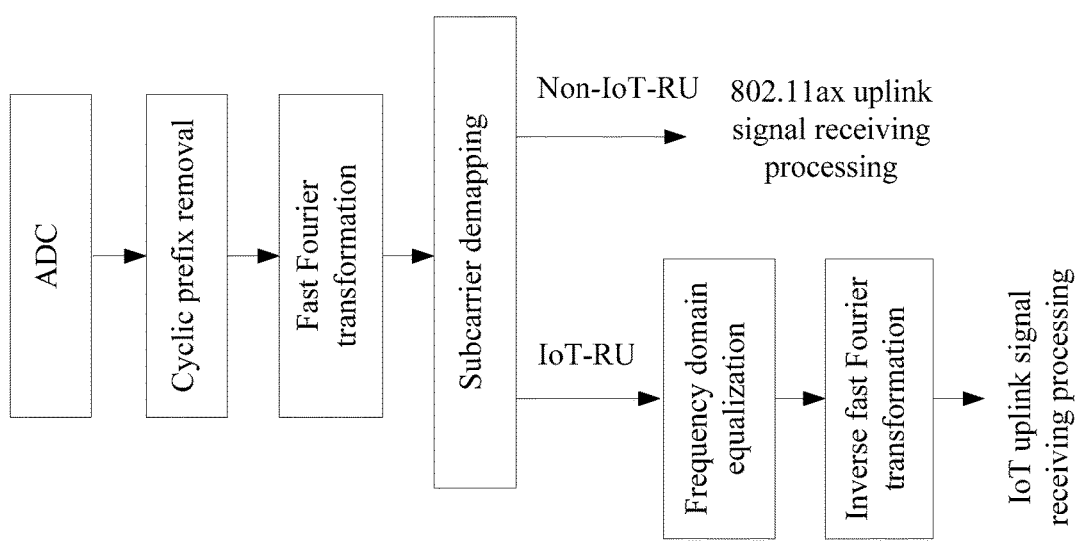
FIG. 25 is a schematic diagram of a process in which a network side device receives uplink data according to an embodiment of the present disclosure.

In this embodiment of the present disclosure, the network side device may receive the uplink data frame in a single carrier manner. As shown in FIG. 25, an implementation process of receiving the uplink data frame in a single carrier manner includes: performing, by the network side device, CP removal and FFT processing on an uplink baseband received signal obtain by means of sampling for transformation to a frequency domain, where 256-point FFT, 512-point FFT, and 1024-point FFT are respectively performed on a 20 MHz channel bandwidth, a 40 MHz channel bandwidth, and an 80 MHz channel bandwidth; performing a subcarrier demapping operation, and performing 802.11ax uplink signal receiving processing on a signal in a non-IoT-RU to obtain 802.11ax uplink data; and performing frequency domain equalization on a signal in an IoT-RU, then performing IFFT for transformation to a time domain, and finally performing IoT uplink signal receiving processing such as demodulation and decoding, to obtain IoT uplink data. It should be noted that, if a modulation manner such as GFSK is used, frequency domain equalization processing may be not performed.

Typically, when a sampling frequency of an IoT signal obtained after the frequency domain equalization is 2.5 MHz, the IoT-RU is an RU including 26 subcarriers, and 32-point IFFT may be performed for transformation to a time domain. When a sampling frequency of an IoT signal obtained after the frequency domain equalization is 5 MHz, the IoT-RU is an RU including 52 subcarriers, and 64-point IFFT may be performed for transformation to a time domain.

It should be noted that, in this embodiment of the present disclosure, the IoT terminal does not send or receive the legacy preambles and the HEW preambles included in the uplink data frame and the downlink data frame, and the legacy preambles and the HEW preambles are used for communication between the network side device and the STA. That is, the legacy preamble and the HEW preamble in the downlink data frame are sent by the network side device, and the legacy preamble and the HEW preamble in the uplink data frame are sent by the STA. The IoT device filters out an out-of-band signal of the IoT-RU by using an analog filter of the receive channel, and receives an in-band signal of the IoT-RU. Therefore, in this embodiment of the present disclosure, both the first RU included in the data field of the downlink data frame and the third RU included in the data field of the uplink data frame have an independent frame structure that is independent of the legacy preamble and the HEW preamble in the downlink data frame. In this embodiment of the present disclosure, the independent frame structure may be referred to as an IoT frame.

Specifically, in this embodiment of the present disclosure, the IoT preamble includes the physical layer control information of the downlink IoT frame or the uplink IoT frame, and the IoT data field is used to transmit the downlink data or the uplink data between the network side device and the IoT terminal. The physical layer control information of the downlink IoT frame includes a synchronization sequence used by the IoT terminal to obtain timing synchronization and frequency synchronization of the downlink IoT frame, a training sequence used by the IoT terminal to obtain channel estimation required for demodulating the downlink IoT frame, or the like. The physical layer control information of the uplink IoT frame includes a synchronization sequence used by the network side device to obtain timing synchronization and frequency synchronization of the uplink IoT frame, a training sequence used by the network side device to obtain channel estimation required for demodulating the uplink IoT frame, or the like. In other words, in this embodiment of the present disclosure, the network side device parses a preamble part of the uplink IoT frame to obtain information about timing synchronization, frequency synchronization, or channel estimation with the IoT terminal. That is, the IoT terminal needs to send only a narrow-band uplink IoT frame, and does not need to support a high bandwidth of 20/40/80 MHz. Therefore, in the present disclosure, a narrow-band IoT terminal with a constrained bandwidth can be effectively supported, thereby meeting a requirement of low complexity and low power consumption of the IoT device.

Figure 26:
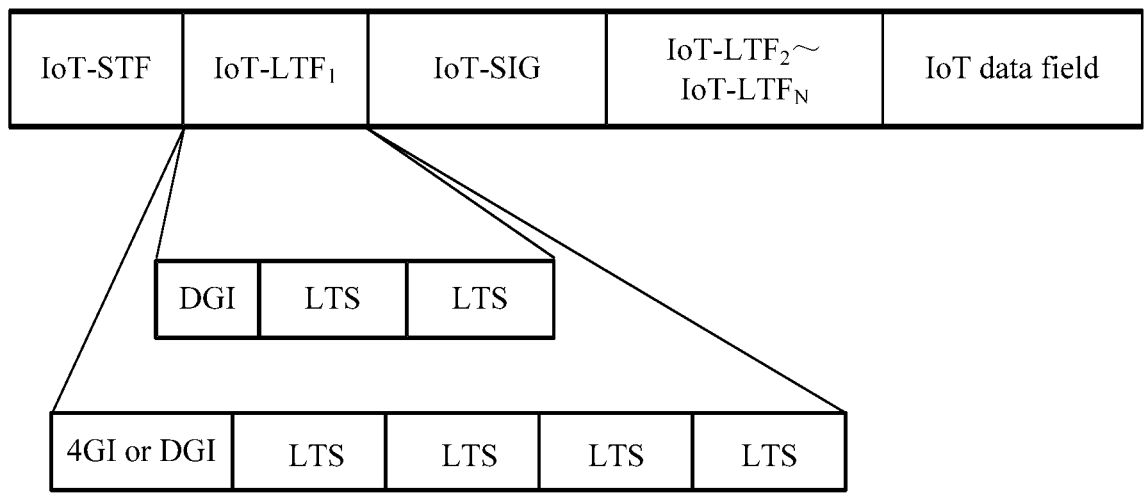
FIG. 26 is a schematic structural diagram of an OFDM-based IoT frame according to an embodiment of the present disclosure.

FIG. 26 is an embodiment of an OFDM-based IoT frame according to an embodiment of the present disclosure. An IoT-STF is used for IoT timing synchronization, automatic gain control, and the like. An IoT-SIG is used to transmit IoT physical layer signaling. An IoT-LTF$_1$ is used to obtain channel estimation required for demodulating the IoT-SIG. An IoT-LTF$_2$ to an IoT-LTF$_N$ are used to obtain MIMO (Multiple Input Multiple Output) channel estimation required for demodulating an IoT data field in multiple-input multiple-output transmission. The IoT data field is used to transmit IoT uplink data or IoT downlink data. For a design of a synchronization sequence transmitted by the IoT-STF, refer to the prior art. Details are not described in this embodiment of the present disclosure.

In this embodiment of the present disclosure, to cover a remote IoT device, the IoT-STF uses a longer synchronization sequence. For example, a length of the IoT-STF may be twice a length of an IoT OFDM symbol, that is, 12.8×2=25.6 microseconds. The IoT-LTF$_1$ may use a structure similar to that of an L-LTF. As shown in FIG. 26, a double guard interval (DGI) is twice a CP length of the IoT OFDM symbol. Two long training sequence (LTS) symbols are continuously transmitted, and a length of each LTS symbol is 12.8 microseconds. Alternatively, a longer symbol is used, that is, a four-time guard interval (4GI) is used, and four times of a CP length of the IoT OFDM symbol is used as a cyclic prefix, or a DGI is used as a cyclic prefix. The IoT-LTF$_2$ to the IoT-LTF$_N$ may use a structure similar to that of an HE-LTF. To cover a remote IoT device, a symbol of each of the IoT-LTF$_2$ to the IoT-LTF$_N$ uses a structure the same as that of the IoT-LTF$_1$, that is, a DGI or a 4GI is used as a cyclic prefix, and two or four same training symbols are continuously transmitted. To ensure reliable transmission of an IoT SIG, binary phase shift keying (BPSK) and channel coding of a 1/2 coding rate may be performed. To cover a remote IoT device, the IoT SIG may be repeatedly transmitted, that is, an OFDM symbol of each IoT SIG is transmitted two or more times.

Figure 27:
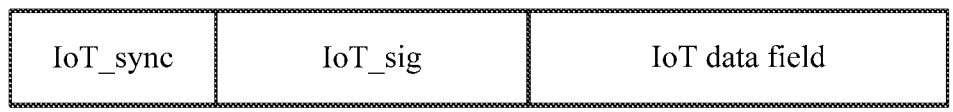
FIG. 27 is a schematic structural diagram of a single carrier based IoT frame according to an embodiment of the present disclosure.

FIG. 27 is an embodiment of a single carrier based IoT frame according to an embodiment of the present disclosure. An IoT sync is used to transmit a synchronization sequence, and is used for IoT timing synchronization and automatic gain control. An IoT_sig is used to transmit IoT physical layer signaling. An IoT data field is used to transmit IoT uplink data or IoT downlink data. In this embodiment, GFSK or DPSK modulation is performed on both the IoT_sig and the IoT data field. Because this type of modulation does not require channel estimation for coherent demodulation, a preamble of an IoT frame does not transmit a field for sending a reference symbol. Therefore, receiving processing of an IoT signal is relatively simple in this embodiment, and has advantages of low costs and low power consumption.

Figure 28:
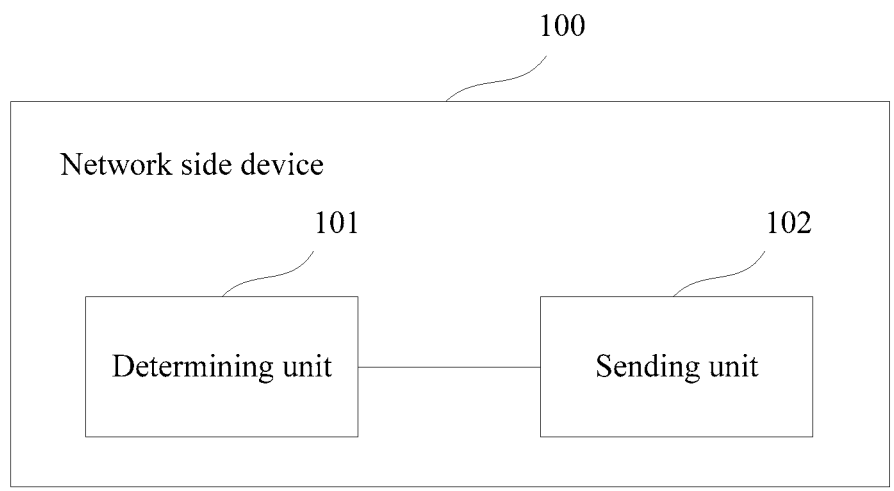
FIG. 28 is a schematic structural diagram of a first network side device according to an embodiment of the present disclosure.

Based on the first IoT communication method provided in the embodiments of the present disclosure, an embodiment of the present disclosure provides a network side device 100. As shown in FIG. 28, the network side device 100 includes a determining unit 101 and a sending unit 102.

The determining unit 101 is configured to determine a terminal device that performs downlink data transmission, where the terminal device includes an IoT terminal.

The sending unit 102 is configured to send a downlink data frame.

The downlink data frame includes a legacy preamble, a high efficiency wireless local area network HEW preamble, and a data field.

A subcarrier resource that is corresponding to the data field in a frequency domain includes at least one RU. The RU is used to send a downlink IoT frame to the IoT terminal, where the downlink IoT frame includes an IoT preamble and an IoT data field, the IoT preamble is used to transmit physical layer control information of the downlink IoT frame, and the IoT data field is used to transmit downlink data between the network side device 100 and the IoT terminal.

In an implementation, the terminal device further includes a station STA.

The subcarrier resource that is corresponding to the data field in the frequency domain further includes at least one other RU different from the RU.

The at least one other RU is used to transmit downlink data between the network side device 100 and the STA.

The sending unit 102 specifically sends the downlink IoT frame to the IoT terminal by using the RU in the following manner:

using a specified quantity of subcarriers in two edge locations of the RU as guard subcarriers;

using a specified quantity of subcarriers in a middle location of the RU as direct current subcarriers; and sending the downlink IoT frame to the IoT terminal by using a subcarrier, included in the RU, other than the guard subcarrier and the direct current subcarrier.

Further, the sending unit 102 specifically generates the data field included in the downlink data frame in the following manner:

performing coding and modulation on the downlink data between the network side device 100 and the IoT terminal to obtain an IoT downlink modulation symbol, and mapping the IoT downlink modulation symbol to a subcarrier included in the at least one RU;

performing coding and modulation on the downlink data between the network side device 100 and the STA to obtain a wireless local area network WLAN downlink modulation symbol, and mapping the WLAN downlink modulation symbol to a subcarrier included in the at least one other RU; and performing inverse fast Fourier transformation IFFT on a frequency domain signal that includes a subcarrier corresponding to the at least one RU and a subcarrier corresponding to the at least one other RU, and adding a cyclic prefix to generate a downlink baseband signal for IoT and WLAN hybrid transmission.

Specifically, the sending unit 102 may further send the downlink IoT frame to the IoT terminal by using the RU in the following manner:

using a specified quantity of subcarriers in two edge locations of the RU as guard subcarriers; and sending the downlink IoT frame to the IoT terminal in a single carrier manner on a frequency band corresponding to a subcarrier, included in the RU, other than the guard subcarrier.

Further, the sending unit 102 may specifically generate the data field included in the downlink data frame in the following manner:

performing coding and modulation on the downlink data between the network side device 100 and the STA to obtain a wireless local area network WLAN downlink modulation symbol, and mapping the WLAN downlink modulation symbol to a subcarrier included in the at least one other RU; performing inverse fast Fourier transformation IFFT on a frequency domain signal that includes a subcarrier corresponding to the at least one other RU, and adding a cyclic prefix CP to generate a WLAN downlink baseband signal; performing coding and modulation on the downlink data between the network side device 100 and the IoT terminal, and adding a CP to generate an IoT downlink single carrier symbol; performing waveform shaping filtering on the IoT downlink single carrier symbol to obtain an IoT downlink baseband signal; performing frequency translation on the IoT downlink baseband signal to obtain an IoT downlink band-pass signal, where a center frequency of the IoT downlink band-pass signal is $f_r$, and $f_r$ is a frequency difference between a zero frequency and a center frequency of an RU that is used to send a downlink IoT frame; and adding the IoT downlink band-pass signal and the WLAN downlink baseband signal to obtain a downlink baseband signal for IoT and WLAN hybrid transmission.

In this embodiment of the present disclosure, the IoT downlink single carrier symbol and an OFDM symbol of the WLAN downlink baseband signal use CPs of a same length, and a length of the IoT downlink single carrier symbol is the same as a length of the OFDM symbol of the WLAN downlink baseband signal.

Optionally, in this embodiment of the present disclosure, the IoT downlink single carrier symbol includes K modulation symbols, and a period of each modulation symbol is $T_1=T_0/K$, where K is a positive integer that does not exceed a quantity of subcarriers included in the RU that is used to send a downlink IoT frame, $T_1$ is the period of each modulation symbol, and $T_0$ is the length of the OFDM symbol of the WLAN downlink baseband signal.

In another implementation of the present disclosure, the RU that is used to send a downlink IoT frame includes at least one basic RU.

The sending unit 102 is further configured to send channel indication information in the basic RU.

The channel indication information is used to indicate that the IoT terminal is handed over from the basic RU to an RU that is used to send a downlink IoT frame other than the basic RU.

It should be noted that, in this embodiment of the present disclosure, the physical layer control information that is of the downlink IoT frame and that is transmitted by the IoT preamble includes one or any combination of the following sequences: a synchronization sequence used by the IoT terminal to obtain timing synchronization and frequency synchronization of the downlink IoT frame; or a training sequence used by the IoT terminal to obtain channel estimation required for demodulating the downlink IoT frame.

It should be further noted that, the IoT data field includes at least one subframe. The IoT data field includes downlink data of at least two IoT terminals. Downlink data of each IoT terminal occupies at least one subframe; or downlink data of each IoT terminal occupies at least one timeslot of at least one subframe; or downlink data of each IoT terminal occupies at least one subframe and at least one timeslot of the at least one subframe.

Figure 29:
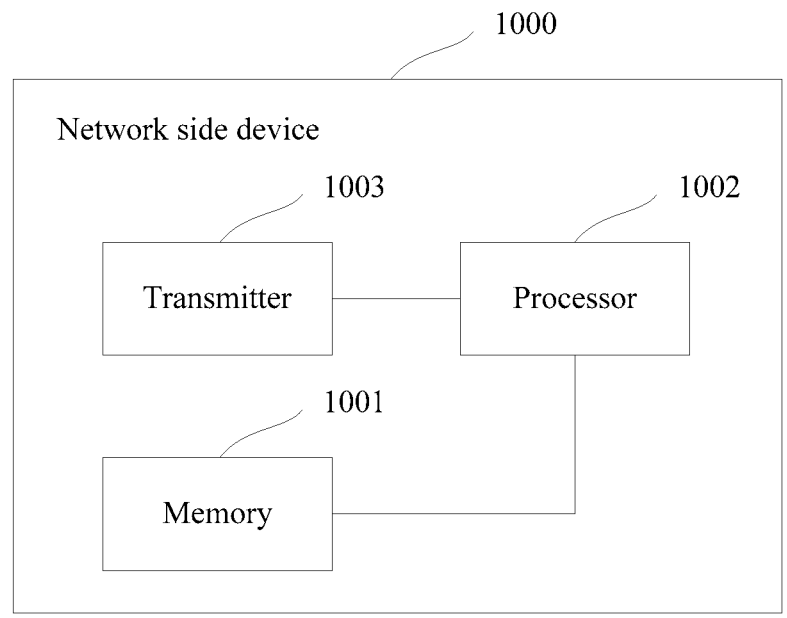
FIG. 29 is another schematic structural diagram of a first network side device according to an embodiment of the present disclosure.

Based on the first IoT communication method provided in the embodiments of the present disclosure, this embodiment of the present disclosure further provides a network side device 1000. As shown in FIG. 29, the network side device 1000 includes a memory 1001, a processor 1002, and a transmitter 1003.

The memory 1001 is configured to store program code executed by the processor 1002.

The processor 1002 is configured to invoke a program stored in the memory 1001 to determine a terminal device that performs downlink data transmission, where the terminal device includes an IoT terminal; and send a downlink data frame by using the transmitter 1003.

The downlink data frame includes a legacy preamble, a high efficiency wireless local area network HEW preamble, and a data field.

A subcarrier resource that is corresponding to the data field in a frequency domain includes at least one RU. The RU is used to send a downlink IoT frame to the IoT terminal, where the downlink IoT frame includes an IoT preamble and an IoT data field, the IoT preamble is used to transmit physical layer control information of the downlink IoT frame, and the IoT data field is used to transmit downlink data between the network side device 100 and the IoT terminal.

In this embodiment of the present disclosure, the processor 1002 is further configured to invoke the program stored in the memory 1001, so as to implement functions of the network side device 100 provided in this embodiment of the present disclosure, and implement the first IoT communication method provided in the embodiments of the present disclosure. For specific functions implemented by the processor 1002, refer to related description in the first IoT communication method and the network side device 100 in the embodiments of the present disclosure. Details are not described herein again.

The network side device 100 and the network side device 1000 provided in this embodiment of the present disclosure may be, for example, an AP. This is not specifically limited in this embodiment of the present disclosure.

According to the network side device 100 and the network side device 1000 provided in this embodiment of the present disclosure, it is determined that the terminal device that performs downlink data transmission includes the IoT terminal, and frequency division multiplexing is performed on a data field of an 802.11ax data frame by using the downlink IoT frame in the downlink data frame sent by the network side device 100 or the network side device 1000, so that the network side device 100 or the network side device 1000 can schedule and coordinate the IoT terminal, thereby reducing an interference risk in IoT transmission. In a process of transmitting the downlink data frame, the STA parses a legacy preamble and a HEW preamble to obtain information about timing synchronization, frequency synchronization, and channel estimation. The IoT terminal parses a preamble part of the downlink IoT frame to obtain information about timing synchronization, frequency synchronization, and channel estimation performed by the IoT terminal, without a need to parse a preamble part in 802.11ax, so that the IoT terminal and the STA do not interfere with each other in a process of performing frequency division on and sharing a channel resource in 802.11ax. In the foregoing manner, the IoT terminal does not need to support a high bandwidth of 20/40/80 MHz, and a narrow-band IoT terminal with a constrained bandwidth is effectively supported, thereby meeting a requirement of low complexity and low power consumption of the IoT device.

Figure 30:
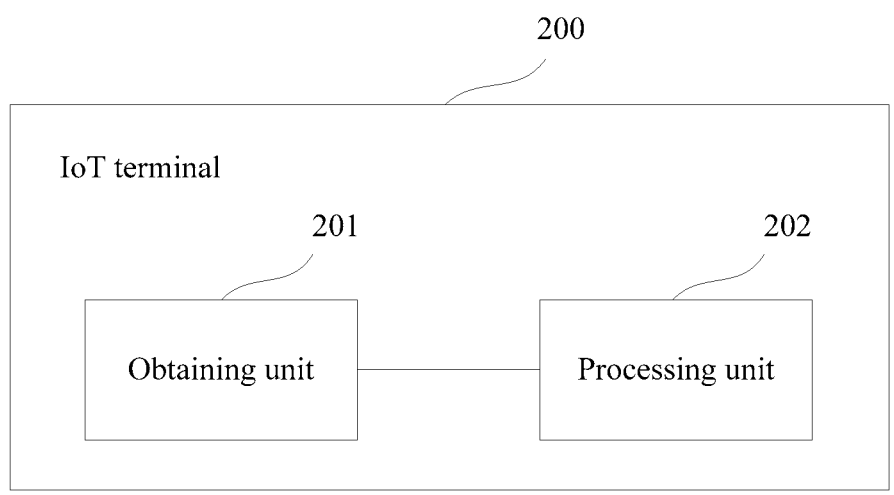
FIG. 30 is a schematic structural diagram of a first IoT terminal according to an embodiment of the present disclosure.

Based on the second IoT communication method provided in the embodiments of the present disclosure, an embodiment of the present disclosure provides an IoT terminal 200. As shown in FIG. 30, the IoT terminal 200 provided in this embodiment of the present disclosure includes an obtaining unit 201 and a processing unit 202.

The obtaining unit 201 is configured to obtain a downlink IoT frame from a downlink received signal, where the downlink received signal includes a downlink data frame sent by a network side device.

The downlink data frame includes a legacy preamble, a high efficiency wireless local area network HEW preamble, and a data field, a subcarrier resource that is corresponding to the data field in a frequency domain includes at least one RU, the at least one RU is used to send a downlink IoT frame, the downlink IoT frame includes an IoT preamble and an IoT data field, the IoT preamble is used to transmit physical layer control information of the downlink IoT frame, and the IoT data field is used to transmit downlink data between the network side device and the IoT terminal 200.

The processing unit 202 is configured to process the downlink IoT frame obtained by the obtaining unit 201, to obtain the downlink data between the network side device and the IoT terminal 200.

In this embodiment of the present disclosure, a bandwidth of a receive channel of the IoT terminal 200 does not exceed a bandwidth of the RU. A carrier frequency used by the receive channel of the IoT terminal 200 is $f_0+f_r$, where $f_0$ is a carrier frequency of the downlink IoT frame, and $f_r$ is a frequency difference between a center frequency of the RU and a zero frequency.

In an implementation of this embodiment of the present disclosure, the processing unit 202 is specifically configured to process the downlink IoT frame to obtain the downlink data between the network side device and the IoT terminal 200 in the following manner:

removing a cyclic prefix CP from each orthogonal frequency division multiplexing OFDM symbol of the downlink IoT frame, and performing upsampling and fast Fourier transformation FFT to obtain an IoT modulation signal that is mapped to a subcarrier included in the RU; and performing demodulation and decoding on the IoT modulation signal to obtain the downlink data between the network side device and the IoT terminal 200.

In another implementation of this embodiment of the present disclosure, the processing unit 202 is specifically configured to process the downlink IoT frame to obtain the downlink data between the network side device and the IoT terminal 200 in the following manner:

removing a cyclic prefix CP from each single carrier symbol of the downlink IoT frame, and performing frequency domain equalization to obtain an IoT modulation signal that is mapped to a frequency band corresponding to the RU; and performing demodulation and decoding on the IoT modulation signal to obtain the downlink data between the network side device and the IoT terminal 200.

It should be noted that, in this embodiment of the present disclosure, the physical layer control information that is of the downlink IoT frame and that is transmitted by the IoT preamble may include one or any combination of the following sequences:

A. a synchronization sequence used by the IoT terminal 200 to obtain timing synchronization and frequency synchronization of the downlink IoT frame; or B. a training sequence used by the IoT terminal 200 to obtain channel estimation required for demodulating the downlink IoT frame.

Figure 31:
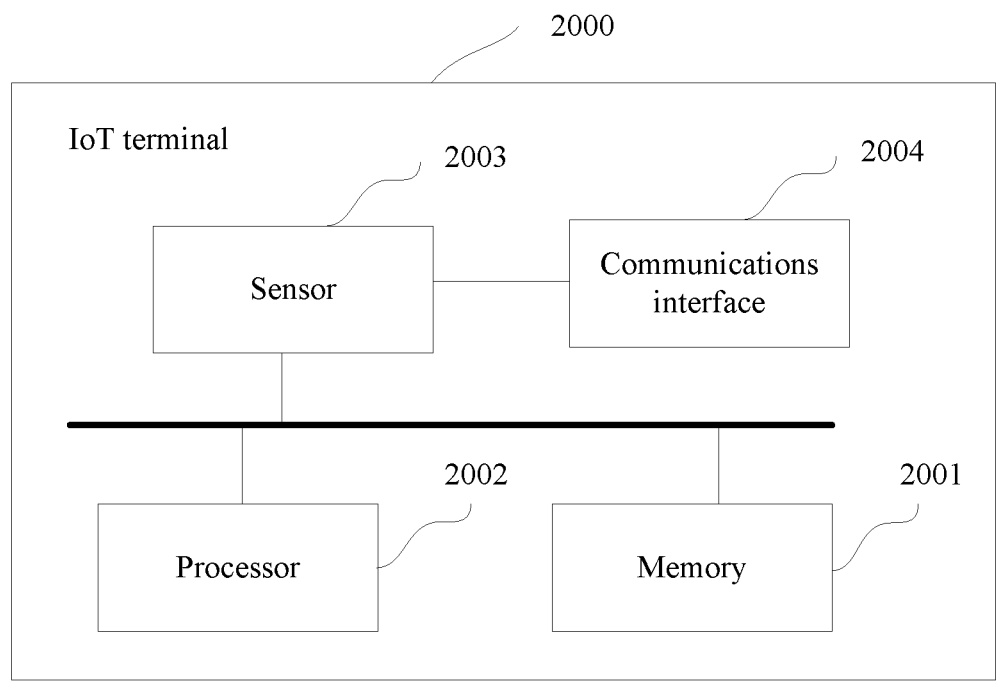
FIG. 31 is another schematic structural diagram of a first IoT terminal according to an embodiment of the present disclosure.

Based on the second IoT communication method and the IoT terminal 200 provided in the embodiments of the present disclosure, this embodiment of the present disclosure further provides an IoT terminal 2000. As shown in FIG. 31, the IoT terminal 2000 includes a memory 2001, a processor 2002, a sensor 2003, and a communications interface 2004.

The memory 2001 is configured to store program code executed by the processor 2002.

The processor 2002 is configured to invoke a program stored in the memory 2001 to control the sensor 2003 to obtain a downlink IoT frame from a downlink received signal by using the communications interface 2004, and process the downlink IoT frame to obtain downlink data between a network side device and the IoT terminal 2000.

In this embodiment of the present disclosure, the downlink received signal includes a downlink data frame sent by the network side device. The downlink data frame includes a legacy preamble, a HEW preamble, and a data field. The legacy preamble and the HEW preamble are used for communication between the network side device and a station STA, and a subcarrier resource that is corresponding to the data field in a frequency domain includes at least one RU. The at least one RU is used to send a downlink IoT frame, and the downlink IoT frame includes an IoT preamble and an IoT data field. The IoT preamble is used to transmit physical layer control information of the downlink IoT frame, and the IoT data field is used to transmit downlink data between the network side device and the IoT terminal.

In this embodiment of the present disclosure, the processor 2002 is further configured to invoke the program stored in the memory 2001, so as to implement functions of the IoT terminal 200 provided in this embodiment of the present disclosure, and implement the second IoT communication method provided in the embodiments of the present disclosure. For specific functions implemented by the processor 2002, refer to related description in the second IoT communication method and the IoT terminal 200 in the embodiments of the present disclosure. Details are not described herein again.

According to the IoT terminal 200 and the IoT terminal 2000 provided in this embodiment of the present disclosure, the received IoT downlink signal includes the downlink data frame sent by the network side device, and frequency division multiplexing is performed on the downlink IoT frame in the downlink data frame and a data field of an 802.11ax data frame, so that the IoT terminal can be scheduled and coordinated by the network side device, thereby reducing an interference risk in IoT transmission. In a process of transmitting the downlink data frame, the STA parses a legacy preamble and a HEW preamble to obtain information about timing synchronization, frequency synchronization, and channel estimation. The IoT terminal parses a preamble part of the downlink IoT frame to obtain information about timing synchronization, frequency synchronization, and channel estimation performed by the IoT terminal, without a need to parse a preamble part in 802.11ax, so that the IoT terminal and the STA do not interfere with each other in a process of performing frequency division on and sharing a channel resource in 802.11ax. In the foregoing manner, the IoT terminal does not need to support a high bandwidth of 20/40/80 MHz, and a narrow-band IoT terminal with a constrained bandwidth is effectively supported, thereby meeting a requirement of low complexity and low power consumption of the IoT device.

Figure 32:
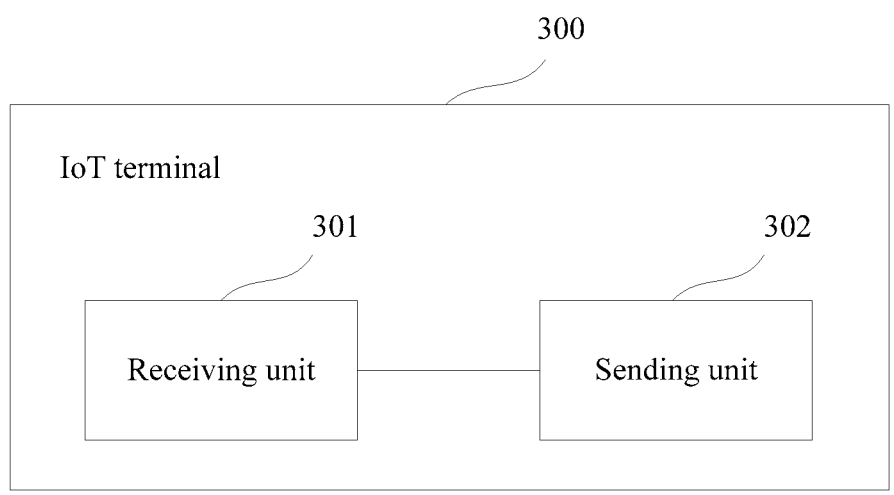
FIG. 32 is a schematic structural diagram of a second IoT terminal according to an embodiment of the present disclosure.

Based on the third IoT communication method provided in the embodiments of the present disclosure, an embodiment of the present disclosure provides an IoT terminal 300. As shown in FIG. 32, the IoT terminal 300 provided in this embodiment of the present disclosure includes a receiving unit 301 and a sending unit 302.

The receiving unit 301 is configured to receive an uplink transmission scheduling request sent by a network side device, where the uplink transmission scheduling request is used to schedule the IoT terminal 300 to send an uplink IoT frame, the uplink IoT frame is located in a data field of an uplink data frame, a subcarrier resource that is corresponding to the data field of the uplink data frame in a frequency domain includes at least one resource unit RU, and the at least one RU is used to send the uplink IoT frame.

The sending unit 302 is configured to send the uplink IoT frame according to the uplink transmission scheduling request received by the receiving unit 301.

In this embodiment of the present disclosure, the uplink IoT frame includes an IoT preamble and an IoT data field, the IoT preamble is used to transmit physical layer control information of the uplink IoT frame, and the IoT data field is used to transmit uplink data between the network side device and the IoT terminal 300.

Specifically, in this embodiment of the present disclosure, the sending unit 302 specifically sends the uplink IoT frame in the following manner:

using a specified quantity of subcarriers in two edge locations of the RU as guard subcarriers; using a specified quantity of subcarriers in a middle location of the RU as direct current subcarriers; and sending the uplink IoT frame to the network side device on a subcarrier, included in the RU, other than the guard subcarrier and the direct current subcarrier.

In an implementation provided in this embodiment of the present disclosure, the sending unit 302 specifically sends the uplink IoT frame by using the RU in the following manner:

performing coding and modulation on the uplink data between the network side device and the IoT terminal 300 to obtain an IoT uplink modulation symbol, and mapping the IoT uplink modulation symbol to a subcarrier included in the RU; performing IFFT and downsampling on a frequency domain signal that includes a subcarrier corresponding to the RU, and adding a cyclic prefix to obtain a first IoT uplink baseband signal; and sending the first IoT uplink baseband signal by using an uplink transmit channel, where a carrier frequency of the uplink transmit channel is $f_0+f_r$, where $f_0$ is a carrier frequency of a channel for transmitting the uplink data frame in which the RU is located, and $f_r$ is a frequency difference between a center frequency of the second RU and a zero frequency.

In another implementation of the present disclosure, the sending unit 302 specifically sends the uplink IoT frame in the following manner:

using a specified quantity of subcarriers in two edge locations of the RU as guard subcarriers; and sending the uplink IoT frame to the network side device in a single carrier manner on a frequency band corresponding to a subcarrier, included in the second RU, other than the guard subcarrier.

Specifically, the sending unit 302 specifically sends the uplink IoT frame in a single carrier manner in the following manner:

performing coding and modulation on the uplink data between the network side device and the IoT terminal 300, and adding a cyclic prefix CP to generate an IoT uplink single carrier symbol; performing waveform shaping filtering on the IoT uplink single carrier symbol to obtain a second IoT uplink baseband signal; and sending the second IoT uplink baseband signal by using an uplink transmit channel, where a carrier frequency of the uplink transmit channel is $f_0+f_r$, where $f_0$ is a carrier frequency of a channel for transmitting the uplink data frame in which the RU is located, and $f_r$ is a frequency difference between a center frequency of the RU and a zero frequency.

Optionally, in this embodiment of the present disclosure, the IoT uplink single carrier symbol and an OFDM symbol of a WLAN uplink baseband signal sent by the STA use CPs of a same length, and a length of the IoT uplink single carrier symbol is the same as a length of the OFDM symbol of the WLAN uplink baseband signal sent by the STA.

It should be noted that, in this embodiment of the present disclosure, the IoT uplink single carrier symbol includes K modulation symbols, and a period of each modulation symbol is $T1=T0/K$; where K is a positive integer that does not exceed a quantity of subcarriers included in the RU, $T_1$ is the period of each modulation symbol, and $T_0$ is the length of the OFDM symbol of the WLAN uplink baseband signal sent by the STA.

It should be further noted that, in this embodiment of the present disclosure, the physical layer control information that is of the uplink IoT frame and that is transmitted by the IoT preamble may include one or any combination of the following sequences:

a synchronization sequence used by the network side device to obtain timing synchronization and frequency synchronization of the uplink IoT frame; or a training sequence used by the network side device to obtain channel estimation required for demodulating the uplink IoT frame.

Optionally, in this embodiment of the present disclosure, the IoT data field may include at least one subframe. The IoT data field includes uplink data of at least two IoT terminals 300. Uplink data of each IoT terminal 300 occupies at least one subframe; or uplink data of each IoT terminal 300 occupies at least one timeslot of at least one subframe; or uplink data of each IoT terminal 300 occupies at least one subframe and at least one timeslot of the at least one subframe.

Optionally, in this embodiment of the present disclosure, the uplink transmission scheduling request may be sent by using a downlink data frame sent by the network side device. The downlink data frame includes a legacy preamble, a high efficiency wireless local area network HEW preamble, and a data field, and a subcarrier resource that is corresponding to the data field of the downlink data frame in the frequency domain includes at least one RU that is used to send the uplink transmission scheduling request.

Figure 33:
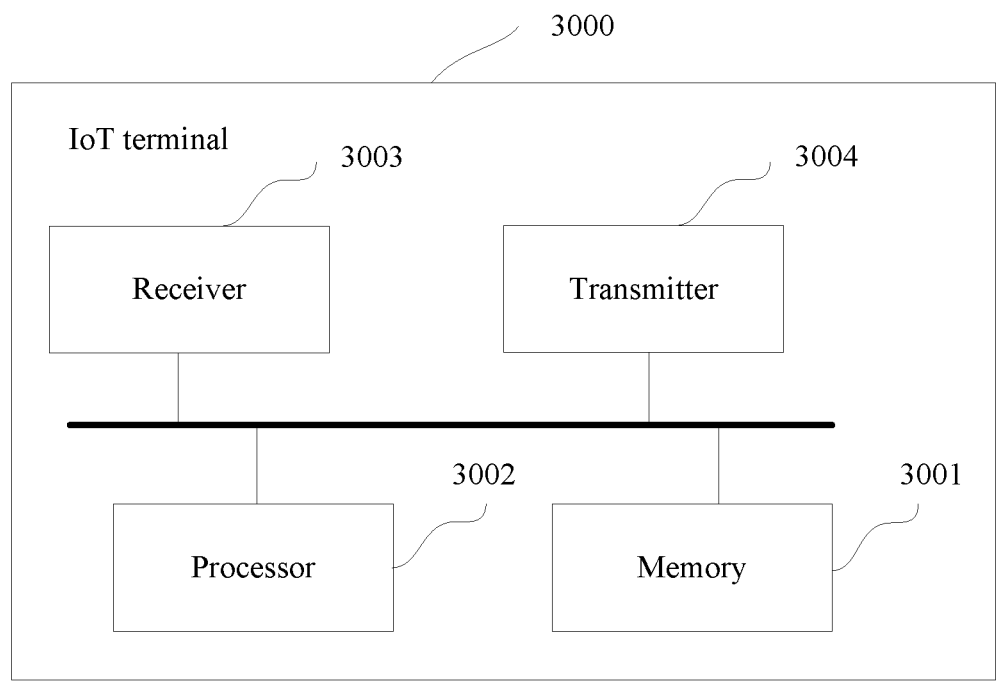
FIG. 33 is another schematic structural diagram of a second IoT terminal according to an embodiment of the present disclosure.

Based on the third IoT communication method and the IoT terminal 300 provided in the embodiments of the present disclosure, this embodiment of the present disclosure further provides an IoT terminal 3000. As shown in FIG. 33, the IoT terminal 3000 includes a memory 3001, a processor 3002, a receiver 3003, and a transmitter 3004.

The memory 3001 is configured to store program code executed by the processor 3002.

The processor 3002 is configured to invoke a program stored in the memory 3001 to receive, by using the receiver 3003, an uplink transmission scheduling request sent by a network side device, and send an uplink IoT frame by using the transmitter 3004 according to the uplink transmission scheduling request.

In this embodiment of the present disclosure, the uplink transmission scheduling request is used to schedule the IoT terminal 3000 to send the uplink IoT frame, the uplink IoT frame is located in a data field of an uplink data frame, a subcarrier resource that is corresponding to the data field of the uplink data frame in a frequency domain includes at least one RU, and the at least one RU is used to send the uplink IoT frame.

In this embodiment of the present disclosure, the uplink IoT frame sent by the IoT terminal 3000 includes an IoT preamble and an IoT data field. The uplink IoT frame includes the IoT preamble and the IoT data field. The IoT preamble is used to transmit physical layer control information of the uplink IoT frame, and the IoT data field is used to transmit uplink data between the network side device and the IoT terminal 3000.

In this embodiment of the present disclosure, the processor 3002 is further configured to invoke the program stored in the memory 3001, so as to implement functions of the IoT terminal 300 provided in this embodiment of the present disclosure, and implement the third IoT communication method provided in the embodiments of the present disclosure. For specific functions implemented by the processor 3002, refer to related description in the third IoT communication method and the IoT terminal 300 in the embodiments of the present disclosure. Details are not described herein again.

According to the IoT terminal 300 and the IoT terminal 3000 provided in this embodiment of the present disclosure, the sent uplink IoT frame is located in the data field of the uplink data frame, the subcarrier resource that is corresponding to the data field of the uplink data frame in the frequency domain includes the at least one RU, and the at least one RU is used to send the uplink IoT frame. In this embodiment of the present disclosure, in the uplink data frame, the IoT terminal and the STA perform frequency division multiplexing on a data field of an 802.11ax data frame, so that the IoT terminal can be scheduled and coordinated by the network side device, thereby reducing an interference risk in IoT transmission. In a process of transmitting the uplink data frame, the IoT terminal needs to send only a narrow-band uplink IoT frame. The IoT terminal and the STA perform frequency division multiplexing on a channel resource in 802.11ax, and do not interfere with each other. In the foregoing manner, the IoT terminal does not need to support a high bandwidth of 20/40/80 MHz, and a narrow-band IoT terminal with a constrained bandwidth is effectively supported, thereby meeting a requirement of low complexity and low power consumption of the IoT device.

Figure 34:
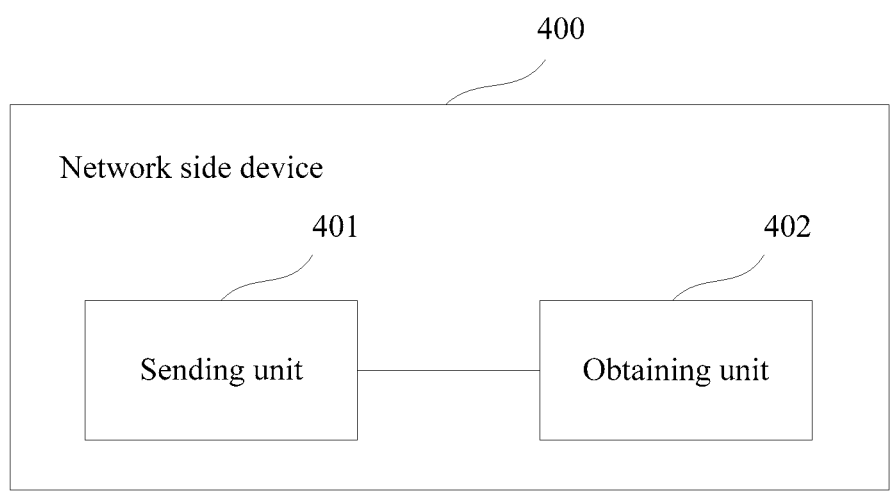
FIG. 34 is a schematic structural diagram of a second network side device according to an embodiment of the present disclosure.

Based on the fourth IoT communication method provided in the embodiments of the present disclosure, an embodiment of the present disclosure provides a network side device 400. As shown in FIG. 34, the network side device 400 provided in this embodiment of the present disclosure includes a sending unit 401 and an obtaining unit 402.

The sending unit 401 is configured to send an uplink transmission scheduling request to an IoT terminal, where the uplink transmission scheduling request is used to schedule the IoT terminal to send an uplink IoT frame.

The obtaining unit 402 is configured to obtain the uplink IoT frame sent by the IoT terminal according to the uplink transmission scheduling request sent by the sending unit 401.

The uplink IoT frame is located in a data field of an uplink data frame, a subcarrier resource that is corresponding to the data field of the uplink data frame in a frequency domain includes at least one resource unit RU, and the at least one RU is used to send the uplink IoT frame. The uplink IoT frame includes an IoT preamble and an IoT data field, the IoT preamble is used to transmit physical layer control information of the uplink IoT frame, and the IoT data field is used to transmit uplink data between the network side device 400 and the IoT terminal.

In an implementation of this embodiment of the present disclosure, the obtaining unit 402 specifically obtains, in the following manner, the uplink IoT frame sent by the IoT terminal according to the uplink transmission scheduling request:

obtaining an uplink received signal, where the uplink received signal includes the uplink IoT frame sent by the IoT terminal; removing a cyclic prefix CP from the uplink received signal, and performing FFT to obtain a frequency domain received signal; obtaining a signal on a subcarrier corresponding to the RU from the frequency domain received signal to obtain an IoT frequency domain signal; and performing frequency domain equalization, IFFT, and demodulation and decoding on the IoT frequency domain signal to obtain the uplink data between the network side device and the IoT terminal.

In this embodiment of the present disclosure, the sending unit 401 specifically sends the uplink transmission scheduling request to the IoT terminal in the following manner:

sending the uplink transmission scheduling request by using a downlink data frame. The downlink data frame includes a legacy preamble, a high efficiency wireless local area network HEW preamble, and a data field, and a subcarrier resource that is corresponding to the data field of the downlink data frame in the frequency domain includes at least one RU that is used to send the uplink transmission scheduling request.

It should be noted that, in this embodiment of the present disclosure, the physical layer control information that is of the uplink IoT frame and that is transmitted by the IoT preamble may include one or any combination of the following sequences:

a synchronization sequence used by the network side device to obtain timing synchronization and frequency synchronization of the uplink IoT frame; or a training sequence used by the network side device to obtain channel estimation required for demodulating the uplink IoT frame.

Figure 35:
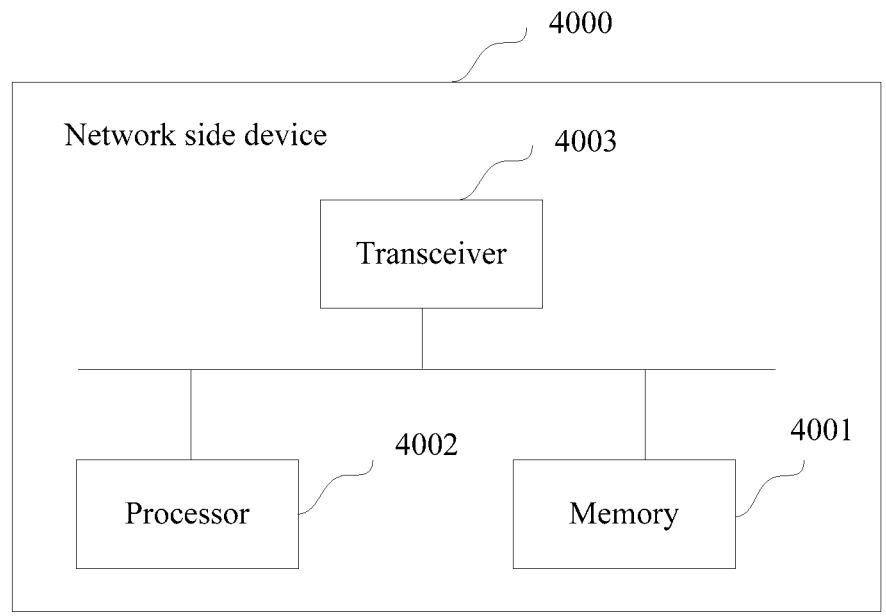
FIG. 35 is another schematic structural diagram of a second network side device according to an embodiment of the present disclosure.

Based on the fourth IoT communication method and the network side device 400 provided in the embodiments of the present disclosure, this embodiment of the present disclosure further provides a network side device 400. As shown in FIG. 35, the network side device 4000 includes a memory 4001, a processor 4002, and a transceiver 4003.

The memory 4001 is configured to store program code executed by the processor 4002.

The processor 4002 is configured to invoke a program stored in the memory 4001 to send an uplink transmission scheduling request to an IoT terminal by using the transceiver 4003, and obtain an uplink IoT frame sent by the IoT terminal according to the uplink transmission scheduling request.

In this embodiment of the present disclosure, the uplink transmission scheduling request may be sent by using a downlink data frame. The downlink data frame includes a legacy preamble, a HEW preamble, and a data field. The legacy preamble and the HEW preamble are used for communication between the network side device and a station STA, and a subcarrier resource that is corresponding to the data field in the frequency domain includes at least one RU that is used to send the uplink transmission scheduling request.

In this embodiment of the present disclosure, the uplink IoT frame is located in a data field of an uplink data frame, a subcarrier resource that is corresponding to the data field of the uplink data frame in the frequency domain includes at least one RU, and the at least one RU is used to send the uplink IoT frame.

In this embodiment of the present disclosure, the processor 4002 is further configured to invoke the program stored in the memory 4001, so as to implement functions of the network side device 400 provided in this embodiment of the present disclosure, and implement the fourth IoT communication method provided in the embodiments of the present disclosure. For specific functions implemented by the processor 4002, refer to related description in the fourth IoT communication method and the network side device 400 in the embodiments of the present disclosure. Details are not described herein again.

According to the network side device 400 and the network side device 4000 provided in this embodiment of the present disclosure, the uplink scheduling request is sent to the IoT terminal by using the downlink data frame, and frequency division multiplexing is performed on the downlink IoT frame in the downlink data frame and a data field of an 802.11ax data frame, so that the network side device 400 or the network side device 4000 can schedule and coordinate the IoT terminal, thereby reducing an interference risk in IoT transmission. The network side device 400 or the network side device 4000 receives the uplink data frame sent by the IoT terminal according to the uplink transmission scheduling request. The uplink data frame includes a legacy preamble, a HEW preamble, and a data field, and the data field includes the RU that is used to transmit the uplink data between the IoT terminal and the network side device. Therefore, in this embodiment of the present disclosure, the IoT terminal needs to send only a narrow-band uplink IoT frame. The IoT terminal and the STA perform frequency division multiplexing on a channel resource in 802.11ax, and do not interfere with each other. In the foregoing manner, the IoT terminal does not need to support a high bandwidth of 20/40/80 MHz, and a narrow-band IoT terminal with a constrained bandwidth is effectively supported, thereby meeting a requirement of low complexity and low power consumption of the IoT device.

Figure 36:
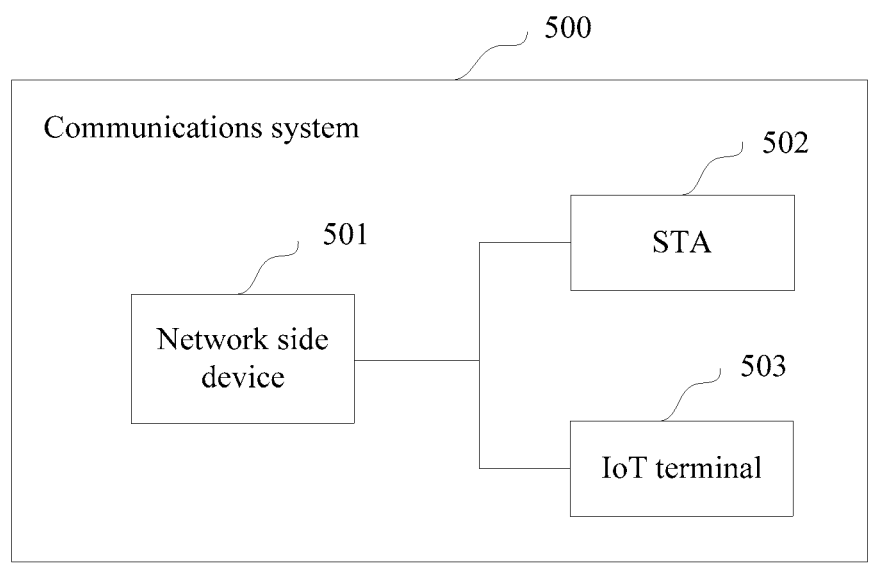
FIG. 36 is a schematic composition diagram of a communications system according to an embodiment of the present disclosure.

An embodiment of the present disclosure further provides a communications system 500. As shown in FIG. 36, the communications system 500 includes a network side device 501, a STA 502, and an IoT terminal 503.

In this embodiment of the present disclosure, the network side device 501 sends a downlink data frame, and the downlink data frame includes a legacy preamble, a HEW preamble, and a data field. The legacy preamble and the HEW preamble are used for communication between the network side device 501 and the STA 502. A subcarrier resource that is corresponding to the data field in a frequency domain includes a first RU and a second RU. The first RU is used to send a downlink IoT frame to the IoT terminal 503, where the downlink IoT frame includes an IoT preamble and an IoT data field, the IoT preamble is used to transmit physical layer control information of the downlink IoT frame, and the IoT data field is used to transmit downlink data between the network side device 501 and the IoT terminal 503. The second RU is used to send downlink data between the network side device 501 and the STA 502 to the STA 502.

The STA 502 parses the legacy preamble and the HEW preamble by using the downlink data frame to obtain information about timing synchronization, frequency synchronization, channel estimation, or the like performed by the STA 502, and obtains the downlink data between the network side device 501 and the STA 502 by using the second RU in the data field.

The IoT terminal 503 parses the IoT preamble by using the downlink data frame to obtain fields of timing synchronization, frequency synchronization and channel estimation performed by the IoT terminal 503, and obtains, by using the first RU in the data field, the downlink data sent by the network side device 501.

In this embodiment of the present disclosure, the network side device 501 may further send an uplink transmission scheduling request to the IoT terminal 503, and schedule the IoT terminal 503 to send uplink data. In this embodiment of the present disclosure, the network side device 501 receives uplink data by using an uplink data frame, where the uplink data frame includes a legacy preamble, a HEW preamble, and a data field. The legacy preamble and the HEW preamble are used for communication between the network side device 501 and the station STA 502. A subcarrier resource that is corresponding to the data field in the frequency domain includes a third RU, and the third RU is used to transmit the uplink data between the network side device 501 and the IoT terminal 503.

It should be noted that, the memory related to the embodiments of the present disclosure may be a read-only memory (ROM) or a random access memory (RAM), or may be an electrically erasable programmable read-only memory (EEPROM), a disk storage medium or other disk storage, or any other medium that can be used to carry or store expected program code in a command or data structure form and can be accessed by a computer. However, the memory is not limited thereto. For example, the memory may be a combination of the foregoing memories.

The processor related to the embodiments of the present disclosure may be a general-purpose central processing unit. The processor uses various interfaces and lines to connect all parts of the whole device, and by running or executing an instruction stored in the memory and invoking data stored in the memory, executes various functions of a corresponding device, and processes data, so as to perform overall monitoring on the corresponding device. Optionally, the processor may include one or more processing units. Preferably, the processor may be integrated with an application processor and a modem processor. The application processor mainly processes an operating system, a user interface, an application program, and the like; and the modem processor mainly processes radio communication. It can be understood that, the modem processor may not be integrated into the processor.

In some embodiments of the present disclosure, the processor and the memory may be implemented in a single chip.

The network side device 501 included in the communications system 500 provided in this embodiment of the present disclosure may be the network side device 100, the network side device 1000, the network side device 400, or the network side device 4000 in the foregoing embodiment, and can implement corresponding functions. Details are not described again in this embodiment of the present disclosure.

The IoT terminal included in the communications system 500 provided in this embodiment of the present disclosure may be the IoT terminal 200, the IoT terminal 2000, the IoT terminal 300, or the IoT terminal 3000 in the foregoing embodiment, and can implement corresponding functions. Details are not described again in this embodiment of the present disclosure.

According to the communications system provided in this embodiment of the present disclosure, a subcarrier resource that is corresponding to a data field of a WLAN data frame in a frequency domain includes an RU that is used to transmit downlink data or uplink data between the network side device and the IoT terminal, and an RU that is used to transmit downlink data or uplink data between the network side device and the STA, so that the IoT terminal and the STA can share a data frame in a WLAN network for data sending or receiving, and further, a network side device in the WLAN can schedule the IoT terminal, thereby reducing a conflict risk in an IoT communication process.

Obviously, a person skilled in the art can make various modifications and variations to the present disclosure without departing from the scope of the present disclosure. The present disclosure is intended to cover these modifications and variations provided that they fall within the scope of protection defined by the following claims and their equivalent technologies.

A person of ordinary skill in the art may understand that all or a part of the steps in each of the foregoing method of the embodiments may be implemented by a program instructing a processor. The foregoing program may be stored in a computer readable storage medium. The storage medium may be a non-transitory medium, such as a random-access memory, read-only memory, a flash memory, a hard disk, a solid state drive, a magnetic tape, a floppy disk, an optical disc, or any combination thereof.

The present disclosure is described with reference to the flowcharts and/or block diagrams of the method and the device according to the embodiments of the present disclosure. It should be understood that computer program instructions may be used to implement each process or each block in the flowcharts and the block diagrams and a combination of a process and a block in the flowcharts and the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and in one or more blocks in the block diagrams.

The foregoing descriptions are merely example implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An Internet of Things (IoT) communication method, comprising:
   determining, by a network side device, at least one terminal device that performs downlink data transmission, wherein the at least one terminal device comprises an IoT terminal; and
   transmitting, by the network side device, a downlink data frame comprising a legacy preamble, a high efficiency wireless (HEW) local area network preamble, and a data field, wherein subcarrier resources corresponding to the data field in a frequency domain comprise at least one resource unit (RU) that includes a downlink IoT frame in the data field transmitted to the IoT terminal, and the downlink IoT frame comprises an IoT preamble for transmitting physical layer control information of the downlink IoT frame and an IoT data field for transmitting downlink data between the network side device and the IoT terminal.

2. The method according to claim 1, wherein:
   the at least one terminal device further comprises a station (STA);
   the subcarrier resources corresponding to the data field further comprise at least one other RU carrying downlink data between the network side device and the STA, wherein the at least one other RU is different from the at least one RU.

3. The method according to claim 1, wherein the network side device transmits the downlink IoT frame in the data field to the IoT terminal by:
   using a specified quantity of subcarriers in two edge locations of the at least one RU as guard subcarriers;
   using a specified quantity of subcarriers in a middle location of the at least one RU as direct current subcarriers; and
   transmitting the downlink IoT frame in the data field to the IoT terminal by using one or more subcarriers comprised in the at least one RU other than the guard subcarriers and the direct current subcarriers.

4. The method according to claim 1, wherein the network side device transmits the downlink IoT frame in the data field to the IoT terminal by:
   using a specified quantity of subcarriers in two edge locations of the at least one RU as guard subcarriers; and
   transmitting the downlink IoT frame to the IoT terminal in a single carrier manner on a frequency band corresponding to a subcarrier, comprised in the RU, other than the guard subcarriers.

5. The method according to claim 2, wherein the data field in the downlink data frame is generated by:
   performing, by the network side device, coding and modulation on the downlink data between the network side device and the STA to obtain a wireless local area network (WLAN) downlink modulation symbol, and mapping the WLAN downlink modulation symbol to a subcarrier comprised in the at least one other RU;
   performing, by the network side device, inverse fast Fourier transformation (IFFT) on a frequency domain signal that comprises a subcarrier corresponding to the at least one other RU, and adding a cyclic prefix (CP) to generate a WLAN downlink baseband signal;
   performing, by the network side device, coding and modulation on the downlink data between the network side device and the IoT terminal, and adding a CP to generate an IoT downlink single carrier symbol;
   performing, by the network side device, waveform shaping filtering on the IoT downlink single carrier symbol to obtain an IoT downlink baseband signal;
   performing, by the network side device, frequency translation on the IoT downlink baseband signal to obtain an IoT downlink band-pass signal, wherein a center frequency of the IoT downlink band-pass signal is $f_r$, and $f_r$ is a frequency difference between a zero frequency and a center frequency of an RU that is used to send a downlink IoT frame; and
   adding, by the network side device, the IoT downlink band-pass signal and the WLAN downlink baseband signal to obtain a downlink baseband signal for IoT and WLAN hybrid transmission.

6. An Internet of Things (IoT) communication method, comprising:
- receiving, by an IoT terminal, a downlink signal sent by a network side device;
- acquiring a downlink data frame from the received downlink signal, wherein the downlink data frame comprises a legacy preamble, a high efficiency wireless (HEW) local area network preamble, and a data field, and wherein subcarrier resources corresponding to the data field in a frequency domain comprise at least one resource unit (RU) including a downlink IoT frame in the data field, the downlink IoT frame comprising an IoT preamble and an IoT data field, wherein the IoT preamble carries physical layer control information of the downlink IoT frame and the IoT data field carries downlink data between the network side device and the IoT terminal; and
- processing, by the IoT terminal, the downlink IoT frame in the data field to obtain the downlink data between the network side device and the IoT terminal.

7. The method according to claim 6, wherein:
- a bandwidth of a receive channel of the IoT terminal does not exceed a bandwidth of the at least one RU; and
- a carrier frequency used by the receive channel of the IoT terminal is $f_0+f_r$, wherein $f_0$ is a carrier frequency of the downlink IoT frame, and $f_r$ is a frequency difference between a center frequency of the RU and a zero frequency.

8. The method according to claim 6, wherein processing, by the IoT terminal, the downlink IoT frame in the data field to obtain the downlink data between the network side device and the IoT terminal comprises:
- removing, by the IoT terminal, a cyclic prefix (CP) from each orthogonal frequency division multiplexing (OFDM) symbol of the downlink IoT frame, and performing upsampling and fast Fourier transformation (FFT) to obtain an IoT modulation signal that is mapped to a subcarrier comprised in the at least one RU; and
- performing, by the IoT terminal, demodulation and decoding on the IoT modulation signal to obtain the downlink data between the network side device and the IoT terminal.

9. The method according to claim 6, wherein processing, by the IoT terminal, the downlink IoT frame in the data field to obtain the downlink data between the network side device and the IoT terminal comprises:
- removing, by the IoT terminal, a cyclic prefix (CP) from each single carrier symbol of the downlink IoT frame, and performing frequency domain equalization to obtain an IoT modulation signal that is mapped to a frequency band corresponding to the at least one RU; and
- performing, by the IoT terminal, demodulation and decoding on the IoT modulation signal to obtain the downlink data between the network side device and the IoT terminal.

10. The method according to claim 6, wherein the physical layer control information within the IoT preamble comprises one or any combination of the following sequences:
- a synchronization sequence used by the IoT terminal to obtain timing synchronization and frequency synchronization of the downlink IoT frame; or
- a training sequence used by the IoT terminal to obtain channel estimation required for demodulating the downlink IoT frame.

11. A network side device, comprising:
- a processor configured to determine at least one terminal device that performs downlink data transmission, wherein the at least one terminal device comprises an IoT terminal; and
- a transmitter configured to transmit a downlink data frame comprising a legacy preamble, a high efficiency wireless (HEW) local area network preamble, and a data field, wherein subcarrier resources corresponding to the data field in a frequency domain comprise at least one resource unit (RU) that includes a downlink IoT frame in the data field transmitted to the IoT terminal, and the downlink IoT frame comprises an IoT preamble for transmitting physical layer control information of the downlink IoT frame and an IoT data field for transmitting downlink data between the network side device and the IoT terminal.

12. The network side device according to claim 11, wherein:
- the at least one terminal device further comprises a station (STA); and
- the subcarrier resources corresponding to the data field further comprise at least one other RU for carrying downlink data between the network side device and the STA, wherein the at least one other RU is different from the at least one RU.

13. The network side device according to claim 11, wherein to transmit the downlink IoT frame to the IoT terminal, the transmitter is configured to:
- use a specified quantity of subcarriers in two edge locations of the at least one RU as guard subcarriers;
- use a specified quantity of subcarriers in a middle location of the at least one RU as direct current subcarriers; and
- transmit the downlink IoT frame to the IoT terminal by using one or more subcarriers comprised in the at least one RU other than the guard subcarriers and the direct current subcarriers.

14. The network side device according to claim 11, wherein to transmit the downlink IoT frame to the IoT terminal, the transmitter is configured to:
- use a specified quantity of subcarriers in two edge locations of the at least one RU as guard subcarriers; and
- transmit the downlink IoT frame to the IoT terminal in a single carrier manner on a frequency band corresponding to a subcarrier, comprised in the at least one RU, other than the guard subcarriers.

15. The network side device according to claim 12, wherein to transmit the downlink data frame, the transmitter is configured to:
- perform coding and modulation on the downlink data between the network side device and the STA to obtain a wireless local area network (WLAN) downlink modulation symbol, and map the WLAN downlink modulation symbol to a subcarrier comprised in the at least one other RU;
- perform inverse fast Fourier transformation (IFFT) on a frequency domain signal that comprises a subcarrier corresponding to the at least one other RU, and add a cyclic prefix (CP) to generate a WLAN downlink baseband signal;
- perform coding and modulation on the downlink data between the network side device and the IoT terminal, and add a CP to generate an IoT downlink single carrier symbol;
- perform waveform shaping filtering on the IoT downlink single carrier symbol to obtain an IoT downlink baseband signal;

perform frequency translation on the IoT downlink baseband signal to obtain an IoT downlink band-pass signal, wherein a center frequency of the IoT downlink band-pass signal is $f_r$, and $f_r$ is a frequency difference between a zero frequency and a center frequency of an RU that is used to send a downlink IoT frame; and add the IoT downlink band-pass signal and the WLAN downlink baseband signal to obtain a downlink baseband signal for IoT and WLAN hybrid transmission.

16. An Internet of Things (IoT) terminal, comprising:
a receiver configured to receive a downlink signal sent by a network side device; and
a processor configured to:
   acquire a downlink data frame from the received downlink signal, wherein the downlink data frame comprises a legacy preamble, a high efficiency wireless (HEW) local area network preamble, and a data field, and wherein subcarrier resources corresponding to the data field in a frequency domain comprise at least one resource unit (RU) including a downlink IoT frame in the data field, the downlink IoT frame comprising an IoT preamble and an IoT data field, wherein the IoT preamble carries physical layer control information of the downlink IoT frame and the IoT data field carries downlink data between the network side device and the IoT terminal, and
   process the downlink IoT frame to obtain the downlink data between the network side device and the IoT terminal.

17. The IoT terminal according to claim 16, wherein:
a bandwidth of a receive channel of the IoT terminal does not exceed a bandwidth of the at least one RU; and
a carrier frequency used by the receive channel of the IoT terminal is $f_0+f_r$, wherein $f_0$ is a carrier frequency of the downlink IoT frame, and $f_r$ is a frequency difference between a center frequency of the RU and a zero frequency.

18. The IoT terminal according to claim 17, wherein to process the downlink IoT frame to obtain the downlink data between the network side device and the IoT terminal, the processor is configured to:
   remove a cyclic prefix (CP) from each orthogonal frequency division multiplexing (OFDM) symbol of the downlink IoT frame, and perform upsampling and fast Fourier transformation FFT to obtain an IoT modulation signal that is mapped to a subcarrier comprised in the RU; and
   perform demodulation and decoding on the IoT modulation signal to obtain the downlink data between the network side device and the IoT terminal.

19. The IoT terminal according to claim 16, wherein to process the downlink IoT frame to obtain the downlink data between the network side device and the IoT terminal, the processor is configured to:
   remove a cyclic prefix (CP) from each single carrier symbol of the downlink IoT frame, and perform frequency domain equalization to obtain an IoT modulation signal that is mapped to a frequency band corresponding to the RU; and
   perform demodulation and decoding on the IoT modulation signal to obtain the downlink data between the network side device and the IoT terminal.

20. The IoT terminal according to claim 16, wherein the physical layer control information within the IoT preamble comprises one or any combination of the following sequences:
   a synchronization sequence used by the IoT terminal to obtain timing synchronization and frequency synchronization of the downlink IoT frame; or
a training sequence used by the IoT terminal to obtain channel estimation required for demodulating the downlink IoT frame.

* * * * *